(12) United States Patent  
Lee et al.

(10) Patent No.: US 12,537,892 B2
(45) Date of Patent: Jan. 27, 2026

(54) ELECTRONIC DEVICE INCLUDING FLEXIBLE DISPLAY, AND OPERATING METHOD THEREOF

(71) Applicant: Samsung Electronics Co., Ltd., Suwon-si (KR)

(72) Inventors: Bona Lee, Suwon-si (KR); Kwansuk Yoo, Suwon-si (KR); Sukjae Lee, Suwon-si (KR); Junwon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 17/836,526

(22) Filed: Jun. 9, 2022

(65) Prior Publication Data

US 2022/0303379 A1 Sep. 22, 2022

Related U.S. Application Data

(63) Continuation of application No. PCT/KR2020/019149, filed on Dec. 24, 2020.

(30) Foreign Application Priority Data

Dec. 26, 2019 (KR) .......................... 10-2019-0175360

(51) Int. Cl.
*H04M 1/72403* (2021.01)
*G06F 1/16* (2006.01)
(Continued)

(52) U.S. Cl.
CPC ...... *H04M 1/72403* (2021.01); *G06F 1/1652* (2013.01); *G06F 1/1681* (2013.01);
(Continued)

(58) Field of Classification Search
CPC .......... H04M 1/72403; H04M 1/0216; H04M 1/0268; H04M 2201/38; H04M 2201/42;
(Continued)

(56) References Cited

U.S. PATENT DOCUMENTS 9,318,070 B2    4/2016   Park et al.
2013/0145319 A1   6/2013   Wein et al.
(Continued)

FOREIGN PATENT DOCUMENTS

KR   10-2008-0046810 A   5/2008
KR   10-2014-0002065 A   1/2014
(Continued)

OTHER PUBLICATIONS

English Translation of KR 20140002065 (Year: 2014).*
(Continued)

*Primary Examiner* — Patrick N Edouard
*Assistant Examiner* — Eboni N Giles
(74) *Attorney, Agent, or Firm* — Jefferson IP Law, LLP

(57) ABSTRACT

An electronic device comprises a foldable housing having a hinge structure, a first display area, a second display area, and a third display area between the areas, wherein content is displayed in the first display area or the second display area according to a touch attribute inputted into the third display area in a folded display state.

18 Claims, 19 Drawing Sheets

(a)

(b)

(51) Int. Cl.
*G06F 3/0486* (2013.01)
*G06F 3/0488* (2022.01)
*H04M 1/02* (2006.01)

(52) U.S. Cl.
CPC .......... *G06F 3/0486* (2013.01); *G06F 3/0488* (2013.01); *H04M 1/0216* (2013.01); *H04M 1/0268* (2013.01); *H04M 2201/38* (2013.01); *H04M 2201/42* (2013.01)

(58) Field of Classification Search
CPC .... G06F 1/1652; G06F 1/1681; G06F 3/0486; G06F 3/0488
See application file for complete search history.

(56) References Cited

U.S. PATENT DOCUMENTS

| | | |
|---|---|---|
| 2015/0185980 A1 | 7/2015 | An et al. |
| 2015/0338888 A1 | 11/2015 | Kim et al. |
| 2015/0378592 A1 | 12/2015 | Kim |
| 2016/0026381 A1 | 1/2016 | Kim et al. |
| 2016/0132074 A1 | 5/2016 | Kim et al. |
| 2017/0109023 A1 | 4/2017 | Cherna et al. |
| 2018/0121056 A1* | 5/2018 | Kyoya ................. G06F 1/1681 |
| 2020/0357362 A1* | 11/2020 | Shin .................... G09G 3/3233 |

FOREIGN PATENT DOCUMENTS

| | | |
|---|---|---|
| KR | 10-2015-0135060 A | 12/2015 |
| KR | 10-2016-0001561 A | 1/2016 |
| KR | 10-2016-0012779 A | 2/2016 |
| KR | 10-2016-0031305 A | 3/2016 |
| KR | 10-1713167 B1 | 3/2017 |
| KR | 10-2017-0079549 A | 7/2017 |

OTHER PUBLICATIONS

English Translation of KR 20150135060 (Year: 2015).*
English Translation of KR 20160031305 (Year: 2016).*
Korean Office Action dated Aug. 12, 2024, issued in Korean Patent Application No. 10-2019-0175360.

* cited by examiner

ELECTRONIC DEVICE INCLUDING FLEXIBLE DISPLAY, AND OPERATING METHOD THEREOF

CROSS-REFERENCE TO RELATED APPLICATION(S)

This application is a continuation application, claiming priority under § 365(c), of an International application No. PCT/KR2020/019149, filed on Dec. 24, 2020, which is based on and claims the benefit of a Korean patent application number 10-2019-0175360, filed on Dec. 26, 2019, in the Korean Intellectual Property Office, the disclosure of which is incorporated by reference herein in its entirety.

BACKGROUND

1. Field

Various embodiments of the present invention relate to an electronic device including a flexible display and a method for operating the same.

2. Description of Related Art

Various electronic devices are commonplace, such as smartphones, tablet personal computers (PCs), portable multimedia players (PMPs), personal digital assistants (PDAs), laptop personal computers (PCs), and wearable devices.

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

Recently, various electronic devices having a large screen display have been developed and distributed. For example, electronic devices with a foldable display or flexible display and devices with a rollable display have been developed and distributed. As large screen display-equipped devices are distributed, various methods may be provided for use of the large screen.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that displays an object related to an application in a specific portion of a front display area of a flexible display in an out-folded state of the flexible display and displays a content of the application on the front display area or a rear display area depending on an attribute of an input to the object and a method for operating the same.

Additional aspects will be set forth in part in the description which follows and, in part, will be apparent from the description, or may be learned by practice of the presented embodiments.

Technical Solution

According to various embodiments, an electronic device may comprise a foldable housing including a hinge structure, a flexible display including a first display area, a second display area, and a third display area between the first display area and the second display area and exposed through the foldable housing, and a processor provided in the foldable housing. The processor may be configured to display a first screen in the first display area and an object related to an application in a first portion of the third display area, in a folded state in which the flexible display is folded through the hinge structure to allow the first display area and the second display area of the flexible display to be exposed to an outside, identify an attribute of a touch input in response to the touch input to the object, based on the attribute of the touch input being identified to be a first attribute, display content of the application in the first display area, and based on the attribute of the touch input being identified to be a second attribute, and an additional event for the second display area being identified, display the content in the second display area.

According to various embodiments, a method for operating an electronic device may comprise displaying a first screen in a first portion of a first display area and an object related to an application in a second portion of the first display area, in a folded state in which a flexible display of the electronic device is folded to allow the first display area and a second display area of the flexible display to be exposed to an outside, identifying an attribute of a touch input in response to the touch input to the object, based on the attribute of the touch input being identified to be a first attribute, displaying content of the application in the first display area, and based on the attribute of the touch input being identified to be a second attribute, and an additional event for the second display area being identified, displaying the content in the second display area.

According to various embodiments, an electronic device may comprise a foldable housing including a hinge structure, a flexible display including a first display area, a second display area, and a third display area between the first display area and the second display area and exposed through the foldable housing, and a memory and a processor provided in the foldable housing. The memory may store instructions that, when executed, enable the processor to display a first screen in the first display area and an object related to an application in a first portion of the third display area, in a folded state in which the flexible display is folded through the hinge structure to allow the first display area and the second display area of the flexible display to be exposed to an outside, identify an attribute of a touch input in response to the touch input to the object, based on the attribute of the touch input being identified to be a first attribute, display content of the application in the first display area, and based on the attribute of the touch input being identified to be a second attribute, and, an additional event for the second display area being identified, display the content in the second display area.

Advantageous Effects

According to various embodiments of the present invention, the electronic device, in the out-folded state of the flexible display, displays an object for providing information or a notification for an application on an edge portion of the front display area of the flexible display and displays the content of the application on the front display area or rear display area in response to an input to the object, thereby providing a method for conveniently identifying the notification or information about the application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in connection with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
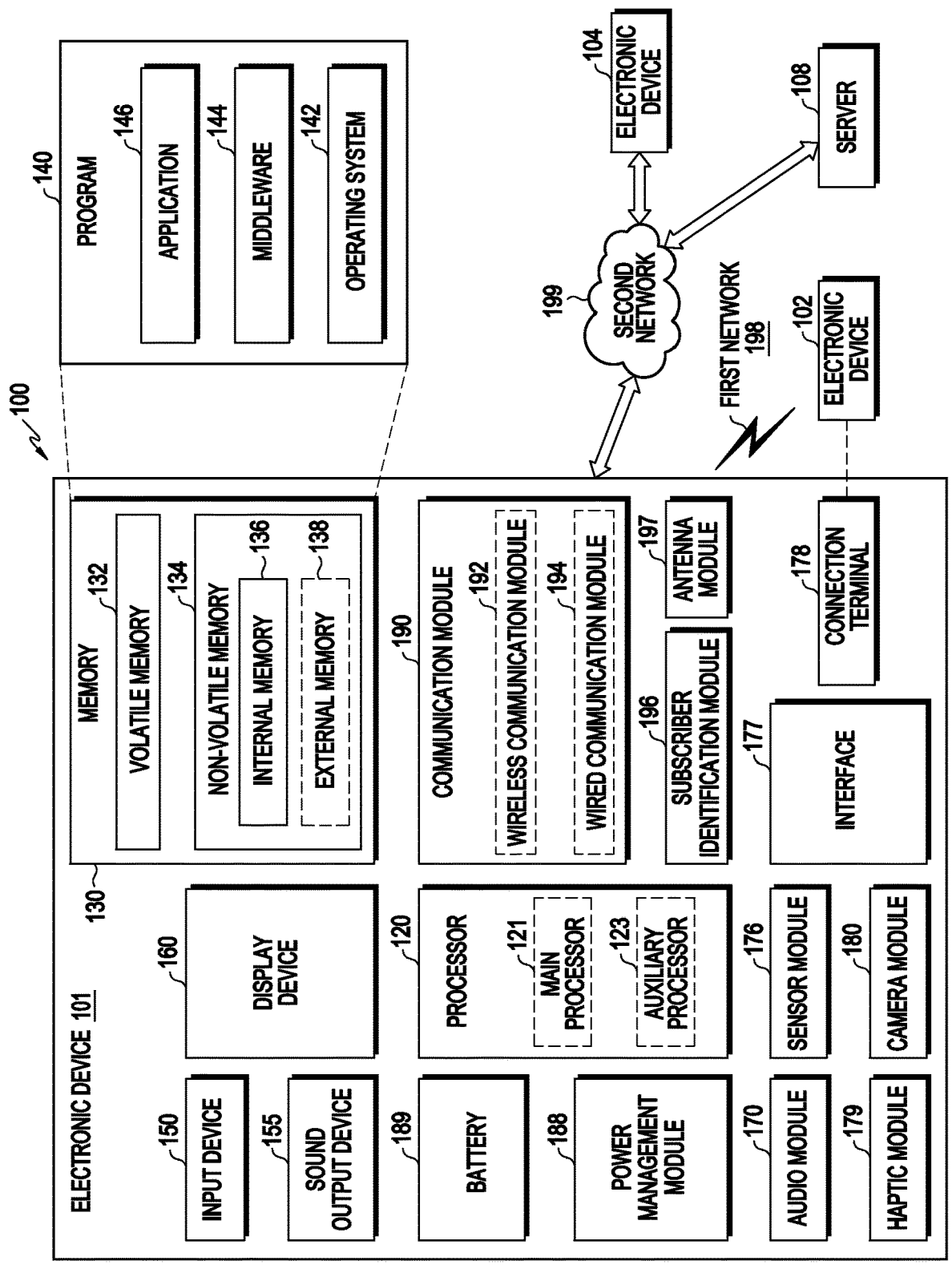
FIG. 1 is a block diagram illustrating an electronic device in a network environment according to various embodiments.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ Wi-Fi direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
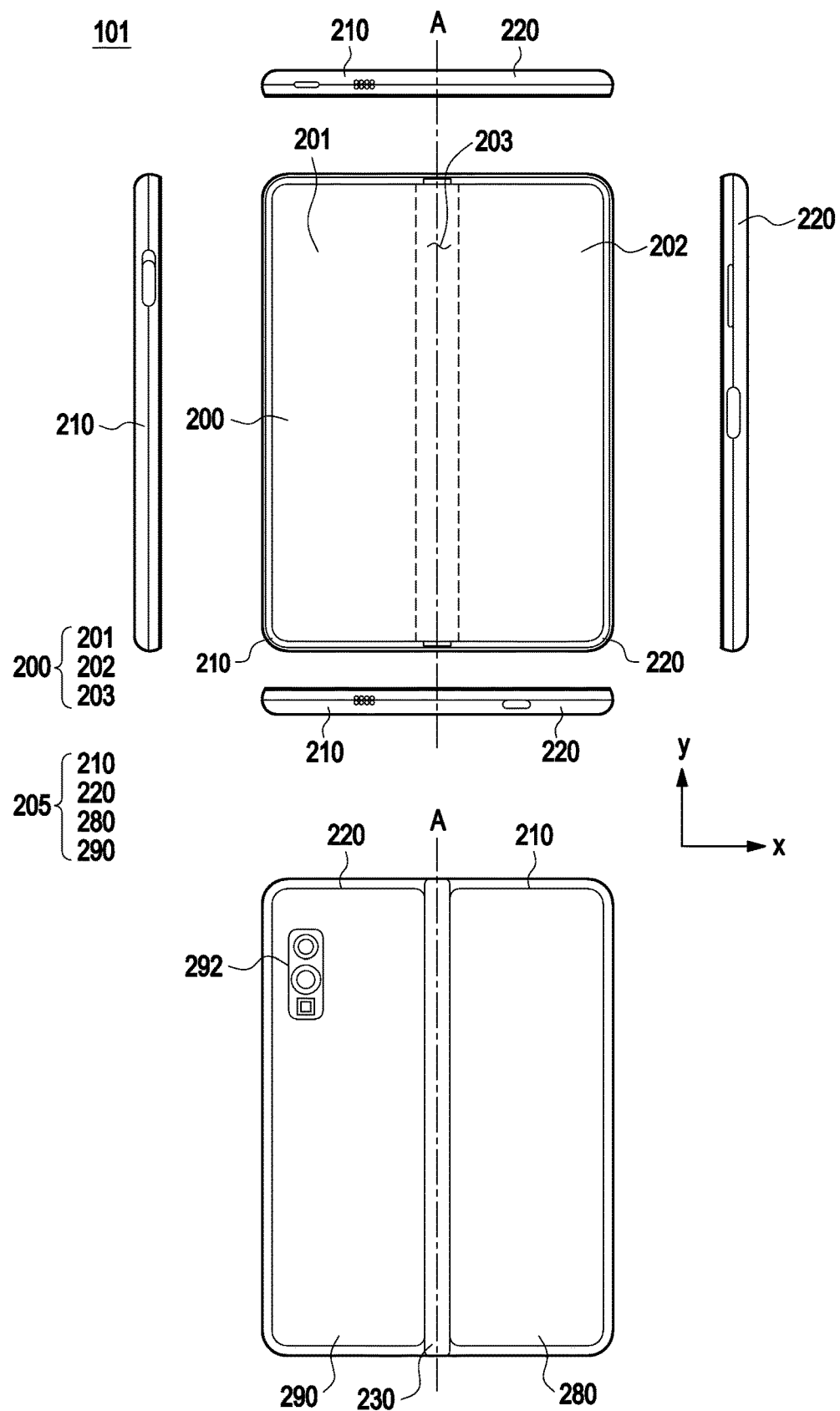
FIG. 2A is a view illustrating an unfolded state of an electronic device according to various embodiments.
Figure 2B:
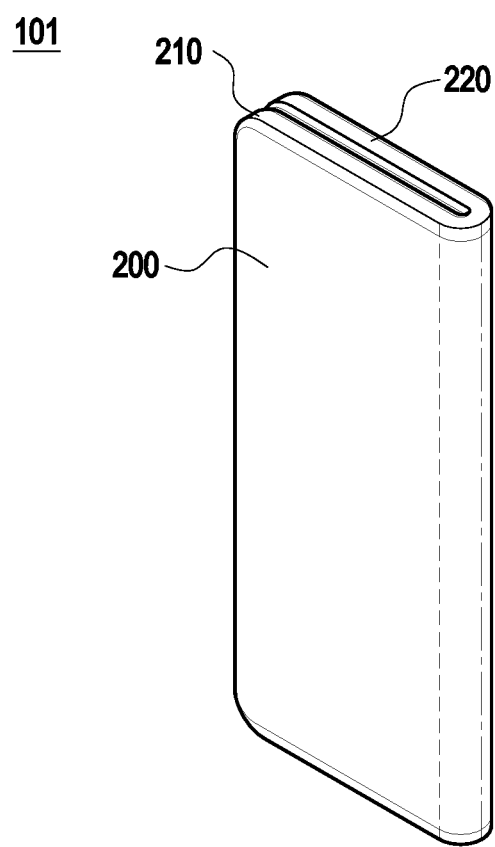
FIG. 2B is a view illustrating a folded state of an electronic device according to various embodiments.

FIG. 2A is a view illustrating an unfolded state of an electronic device according to an embodiment of the disclosure. FIG. 2B is a view illustrating a folded state of an electronic device according to an embodiment of the disclosure.

Referring to FIGS. 2A and 2B, an electronic device 101 may include a foldable housing 205, a hinge cover 230 covering a foldable portion of the foldable housing, and a flexible or foldable display (e.g., display 200) (hereinafter, simply "display 200") disposed in a space formed by the foldable housing 205. In the disclosure, a surface where the display 200 is disposed is defined as a first surface or a front surface of the electronic device 101. The opposite surface of the front surface is defined as a second surface or a rear surface of the electronic device 101. The surface surrounding the space between the front and rear surfaces is defined as a third surface or a side surface of the electronic device 101.

According to various embodiments, the foldable housing 205 may include a first housing structure 210, a second housing structure 220, a first rear cover 280, and a second rear cover 290. The foldable housing 205 of the electronic device 101 are not limited to the shape and coupling shown in FIGS. 2A and 2B but may rather be implemented in other shapes or via a combination and/or coupling of other components. For example, according to various embodiments, in the foldable housing 205, the first housing structure 210 and the first rear cover 280 may be integrally formed with each other, and the second housing structure 220 and the second rear cover 290 may be integrally formed with each other.

According to various embodiments, the first housing structure 210 and the second housing structure 220 may be positioned on opposite sides of a folding axis (axis A), and they may be overall symmetrical in shape with each other with respect to the folding axis A. The first housing structure 210 and the second housing structure 220 may have different angles or distances formed therebetween depending on whether the electronic device 101 is in an unfolded, folded, or intermediate state. The first housing structure 210 and the second housing structure 220 may have shapes symmetrical with each other.

According to various embodiments, at least a portion of the first housing structure 210 and the second housing structure 220 may be formed of a metal or a non-metal material having a predetermined degree of rigidity to support the display 200.

According to various embodiments, the first rear cover 280 may be disposed on one side of the folding axis A on the rear surface of the electronic device 101 and have, e.g., a substantially rectangular periphery which may be surrounded by the first housing structure 210. Similarly, the second rear cover 290 may be disposed on the opposite side of the folding axis on the rear surface of the electronic device 101 and its periphery may be surrounded by the second housing structure 520.

According to various embodiments, the first rear cover 280 and the second rear cover 290 may be substantially symmetrical in shape with respect to the folding axis (axis A). However, the first rear cover 280 and the second rear cover 290 are not necessarily symmetrical in shape. The electronic device 101 may include the first rear cover 280 and the second rear cover 290 in various shapes. According to various embodiments, the first rear cover 280 may be integrally formed with the first housing structure 210, and the second rear cover 290 may be integrally formed with the second housing structure 220.

According to various embodiments, a combined structure of the first rear cover 280, the second rear cover 290, the first housing structure 210, and the second housing structure 220 may form a space where various components (e.g., a printed circuit board or battery) of the electronic device 101 may be disposed. According to various embodiments, one or more components may be arranged or visually exposed on/through the rear surface of the electronic device 101. For example, the first rear cover 280 and/or the second rear cover 290 may include a sub display. Further, the first rear cover 280 and/or the second rear cover 290 may include a proximity sensor and/or a rear camera 292.

Referring to FIG. 2A, the hinge cover 230 may be disposed between the first housing structure 210 and the second housing structure 220 to hide the internal components, e.g., a hinge structure. For example, the hinge structure may be configured to be folded or unfolded inward or outward. According to various embodiments, the hinge cover 230 may be hidden by a portion of the first housing structure 210 and second housing structure 220 or be exposed to the outside depending on the state (e.g., the unfolded state or folded state) of the electronic device 101.

According to various embodiments, the display 200 may be disposed in a space formed by the foldable housing 205. For example, the display 200 may be seated on a recess formed by the foldable housing 205 and may occupy most of the front surface of the electronic device 101.

According to various embodiments, the front surface of the electronic device 101 may include the display 200 and a partial area of the first housing structure 210 and a partial area of the second housing structure 220, which are adjacent to the display 200. The rear surface of the electronic device 101 may include the first rear cover 280, a partial area of the first housing structure 210, which is adjacent to the first rear cover 280, the second rear cover 290, and a partial area of the second housing structure 220, which is adjacent to the second rear cover 290.

According to various embodiments, the display 200 may mean a display at least a portion of which may be transformed into a flat or curved surface. In an embodiment, the display 200 may include a folding area 203, a first display area 201, which is disposed on one side of the folding area 203 (the left side of the folding area 203 of FIG. 2A), and a second display area 202 disposed on the other side (the right side of the folding area 203 of FIG. 2A).

Meanwhile, the segmentation of the display 200 as shown in FIG. 2A is merely an example, and the display 200 may be divided into a plurality of (e.g., four or more, or two) areas depending on the structure or function of the display 200. For example, in an embodiment, in the embodiment illustrated in FIG. 2A, the display 200 may be divided into the areas by the folding area 203 or folding axis (axis A) extending in parallel with the y axis but, in another embodiment, the display 200 may be divided into the areas with respect to another folding area (e.g., a folding area parallel with the x axis) or another folding axis (e.g., a folding axis parallel with the x axis).

The first display area 201 and the second display area 202 may be overall symmetrical in shape with respect to the folding area 203. However, although a partial area of the first display area 201 and/or the second display area 202 may include a notch cut according to the presence of a sensor, the first display area 201 and the second display area 202 may have shapes symmetrical with each other in the remaining area. In other words, the first display area 201 and the second display area 202 may include symmetrical portions and asymmetrical portions.

Described below are the operation of the first housing structure 210 and the second housing structure 220 and each area of the display 200 depending on the state (e.g., the unfolded state (flat state) and folded state) of the electronic device 101.

According to various embodiments, when the electronic device 101 is in the unfolded state (flat state) (e.g., FIG. 2A), the first housing structure 210 and the second housing structure 220 may be angled at 180 degrees therebetween, facing in the same direction. The surface of the first display area 201 and the surface of the second display area 202 of the display 200 may be angled at 180 degrees therebetween while facing in the same direction (e.g., forward of the front surface of the electronic device). The folding area 203 may form the same plane with the first display area 201 and the second display area 202.

According to various embodiments, when the electronic device 101 is in the folded state (e.g., FIG. 2B), the first housing structure 210 and the second housing structure 220 may face each other. The surface of the first housing structure 210 and the surface of the second housing structure 220 of the display 200 may be angled at a small angle (e.g., an angle between 0 degrees and 10 degrees) therefrom while facing each other. At least a portion of the folding area 203 may have a curved surface with a predetermined curvature.

According to various embodiments, the unfolded state of the electronic device 101 may mean a first state of the electronic device 101, and the folded state of the electronic device 101 may mean a second state of the electronic device 101.

According to various embodiments, referring to FIG. 2A, a state in which the center portion of the display 200 is unfolded so that the first housing structure 210 and the second housing structure 220 are continuously arranged may be the first state of the electronic device 101. Referring to FIG. 2B, a state in which the center portion of the display 200 is folded so that one surface of the first housing structure 210 and one surface of the second housing structure 220 are arranged to face each other may be the second state of the electronic device 101.

According to various embodiments, in the first state, the electronic device 101 may activate only one area (e.g., the first display area 201 or the second display area 202) of the display 200. For example, the electronic device 101 may activate only one area of the display 200, which faces the ground, using an acceleration sensor (and/or geomagnetic sensor) or only one area of the display 200, which faces the user, using a camera sensor.

According to various embodiments, the display 200 may be prepared so that at least a portion thereof is bendable (or foldable). The display 200 may include a first display area 201 disposed on the first housing structure 210, a second display area 202 disposed on the second housing structure 220, and a folding area 203 within a predetermined range from where the first housing structure 210 and the second housing structure 220 abut. At least a portion of the folding area may be flexible.

Figure 3:
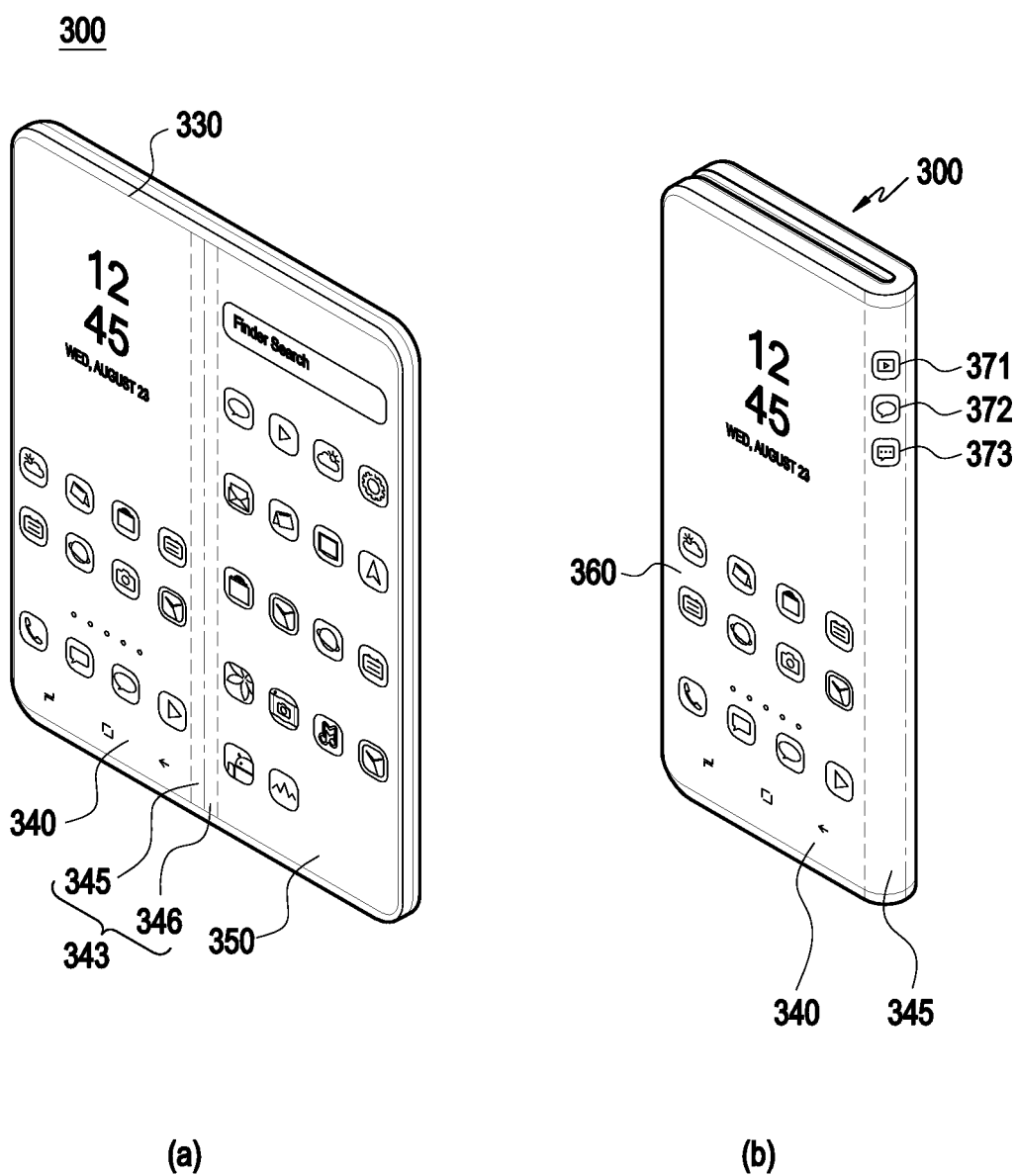
FIG. 3 is a view illustrating operations of an electronic device according to various embodiments.

FIG. 3 is a view illustrating operations of an electronic device according to various embodiments.

Referring to parts (a) and (b) FIG. 3, an electronic device 300 may include a display 330. The electronic device 300 may be implemented to be substantially the same or similar to the electronic device 101 of FIGS. 1, 2A, and 2B. Meanwhile, the operations of the electronic device 300 described below may be performed by a processor (e.g., the processor 120 of FIG. 1) included in the electronic device 300.

According to various embodiments, the display 330 may be implemented to be identical or similar to the display device 160 of FIG. 1 and the display 200 of FIGS. 2A, and 2B. For example, the display 330 may be implemented as a flexible display that may be folded in an out-folding type.

According to various embodiments, the display 330 may include a first display area 340, a second display area 350, and a third display area 343 between the first display area 340 and the second display area 350. For example, the display 330 may include the first display area 340 on the left of the folding axis A and the second display area 350 on the right of the folding axis A. For example, the first display area 340 and the second display area 350 may be areas facing the front or rear when the electronic device 300 is in the folded state. The third display area 343 may correspond to an area in which the hinge structure is positioned. For example, the third display area 343 may include a first portion 345 on the left side of the folding axis A and a second portion 346 on the right side of the folding axis A. For example, when the first display area 340 faces the front in the folded state of the electronic device 300, at least a portion of the first portion 345 of the third display may be viewed from the front. Likewise, when the second display area 350 faces the front in the folded state of the electronic device 300, at least a portion of the second portion 346 of the third display may be viewed from the front.

Meanwhile, the first display area 340, the second display area 350, and the third display area 343 may be areas logically separated for convenience of description but not hardware-wise separated.

The electronic device 300 of part (a) of FIG. 3 may be a first state in which the electronic device 300 (or display 330) is unfolded, or an unfolded state. In other words, the electronic device 300 of part (b) of FIG. 3 may be a second state in which the electronic device 300 (or display 330) is unfolded, or a folded state. In other words, the folded state may be a state in which the display 330 is folded through the hinge structure so that the first display area 340 and the second display area 350 of the display 330 are exposed to the outside. In this case, when the first display area 340 faces the front of the electronic device 300, the second display area 350 may face the rear of the electronic device 300, and when the first display area 340 faces the rear of the electronic device 300, the second display area 350 may face the front of the electronic device 300.

Referring to part (b) of FIG. 3, according to various embodiments, the electronic device 300 may display a first screen 360 in the first display area 340 in the folded state.

For example, the first screen may be a background screen, a home screen, or an application execution screen. Further, in the folded state, the electronic device 300 may display at least one object 371, 372, and 373 related to at least one application in a first portion 345 of the third display area 343. For example, if a notification for the application is identified, the electronic device 300 may display at least one object. Further, if a plurality of notifications for a specific application are generated, the electronic device 300 may display each of a plurality of objects corresponding to the plurality of notifications. Further, for the specific application, the electronic device 300 may display a corresponding object although no notification is present. At least one object may include an image identical or similar to an icon of the corresponding application. Meanwhile, the shape or number of objects described in the disclosure is merely for convenience of description, and various changes may be made to the shape or number of objects displayed in the first portion 345 of the third display area 343.

According to various embodiments, the first portion 345 may be a portion corresponding to a curved surface caused by folding of the electronic device 300. For example, the first portion 345 may be a portion adjacent to the first display area 340 in the third display area 343. However, embodiments of the disclosure are not limited thereto, and according to another embodiment, the first portion 345 may be a portion corresponding to a plane (e.g., a portion of the first display area 340).

According to various embodiments, the electronic device 300 may deactivate the second display area 350 in the folded state. For example, deactivation may mean inactivating touch sensing and/or screen display on the second display area 350. For example, if it is identified that the front surface of the second display area 350 faces the ground using an acceleration sensor in the folded state, the electronic device 300 may deactivate the second display area 350. In contrast, if the electronic device 300 is flipped in the folded state, the electronic device 300 may deactivate the first display area 340.

According to various embodiments, in the folded state, the electronic device 300 may deactivate the second portion 346 of the third display area 343 along with the second display area 350. In contrast, if the electronic device 300 is flipped in the folded state, the electronic device 300 may deactivate the first portion 345 of the third display area 343 along with the first display area 340.

Figure 4:
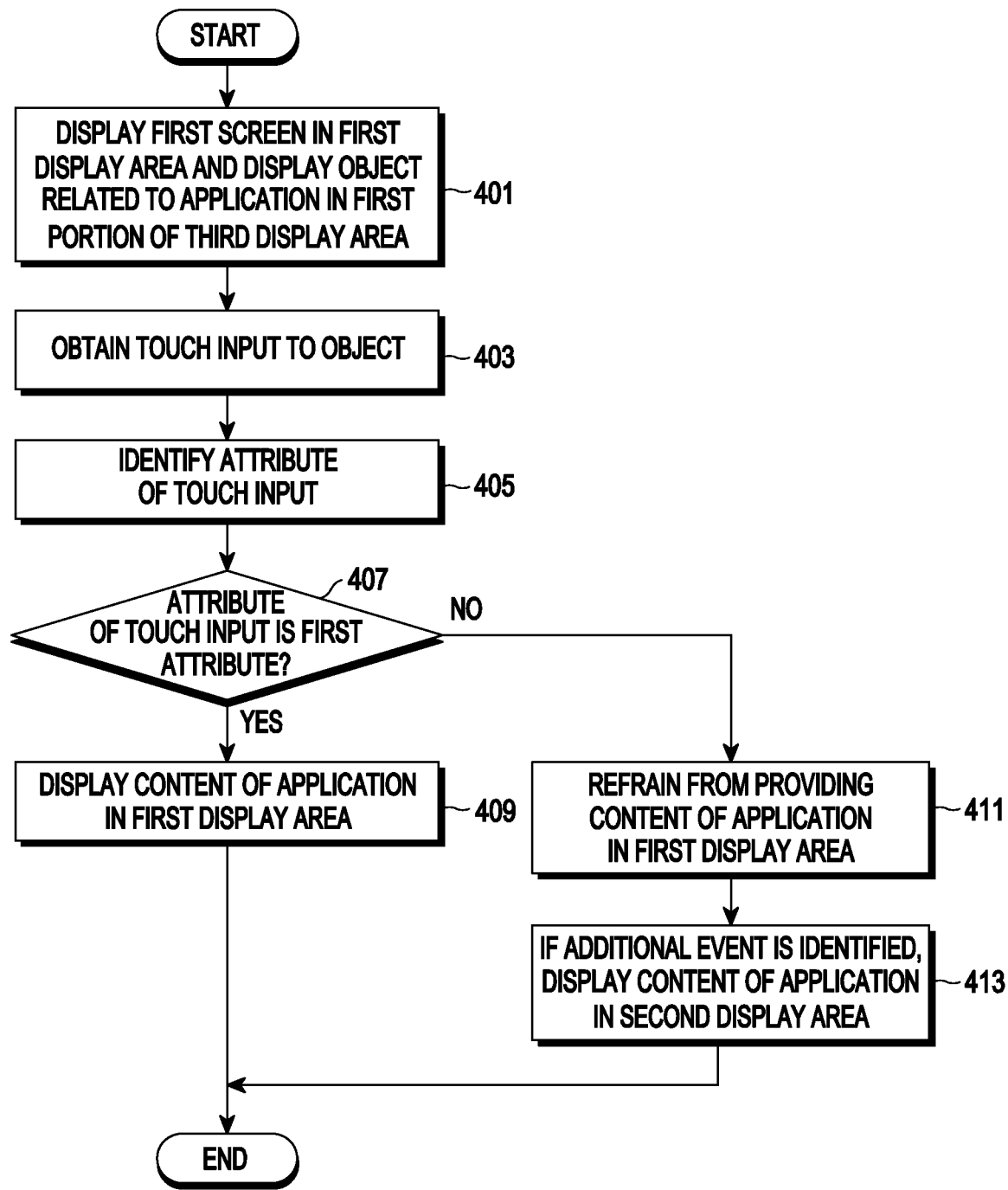
FIG. 4 is a view illustrating operations of an electronic device according to various embodiments.

FIG. 4 is a view illustrating operations of an electronic device according to various embodiments.

Referring to FIG. 4, in operation 401, an electronic device (e.g., the electronic device 300 of FIG. 3), in the folded state, may display a first screen 360 in a first display area (e.g., the first display area 340 of FIG. 3) and at least one object (e.g., objects 371 to 373) related to an application in a first portion 345 of a third display area (e.g., the third display area 343 of FIG. 3).

According to various embodiments, the first display area 340 may be a screen being currently viewed by the user. For example, the electronic device 300 may identify the screen being currently viewed by the user using various sensors (e.g., 176 of FIG. 1). For example, the electronic device 300 may identify the screen being currently viewed by the user, using the slope, gaze, acceleration, and gravity of the electronic device 300, detected through various sensors 176.

According to various embodiments, in operation 403, the electronic device 300 may obtain a touch input to any one object among at least one object. In operation 405, the electronic device 300 may identify the attributes of the touch input in response to the touch input to the corresponding object. For example, the attributes of the touch input may include, e.g., the type of the touch (e.g., tap, swipe, long press, drag, double tap, or multi-tab), the moving direction of the touch, the moving distance of the touch, the strength of the touch, the duration of the touch, or the position where the touch is released.

In operation 407, the electronic device 300 may identify whether the attribute of the touch input to the object is a first attribute. For example, when the touch input (e.g., tap, tap and hold, touch and drag) to the object is detected and released in the first display area 340 or the direction of the touch input to the object (e.g., the direction of a drag) is toward the first display area 340, the electronic device 300 may identify that the attribute of the touch input is the first attribute. Further, when the touch input to the object is released from the second display area 350 or the direction of the touch input is toward the second display area 350, the electronic device 300 may identify that the attribute of the touch input is a second attribute.

In operation 409, if the attribute of the touch input is identified to be the first attribute, the electronic device 300 may display the content of the application corresponding to the corresponding object in the first display area 340. The electronic device 300 may display the content of the application corresponding to the corresponding object in the first display area 340, without separately delay. For example, the electronic device 300 may display the content of the application to overlap the first screen 360 based on the type of the touch input. Or, the electronic device 300 may display the content of the application in a separate window based on the type of the touch input. At this time, the first screen 360 may be moved or shrunken not to overlap the separate window where the content is displayed. Or, if the first screen 360 is an execution screen of a specific application, the electronic device 300 may display the content of the application to allow the first screen 360 not to overlap the content of the application while moving the first screen 360 or may display a second screen which is a shrunken one of the first screen 360.

In operation 411, based on the attribute of the touch input being identified to be the second attribute, the electronic device 300 may refrain from displaying (or providing) of the content of the application corresponding to the corresponding object. For example, the electronic device 300 may refrain from displaying the content of the application in the first display area 340, until an additional event is identified. Further, the electronic device 300 may also refrain from the content of the application in the second display area 350.

In operation 413, if an additional event is identified, the electronic device 300 may display the content of the application in the second display area 350. For example, the additional event may include an event where the electronic device 300 is flipped so that the direction of the second display area 350 is changed. Further, the additional event may include an event where the electronic device 300 is changed to the unfolded state. For example, if an additional event is identified within a preset time from the touch input, the electronic device 300 may display the content of the application in the second display area 350.

By using the above-described function, the user may easily identify a notification for the application. Further, the user may easily configure the screen of the flexible display included in the electronic device.

Figure 5:
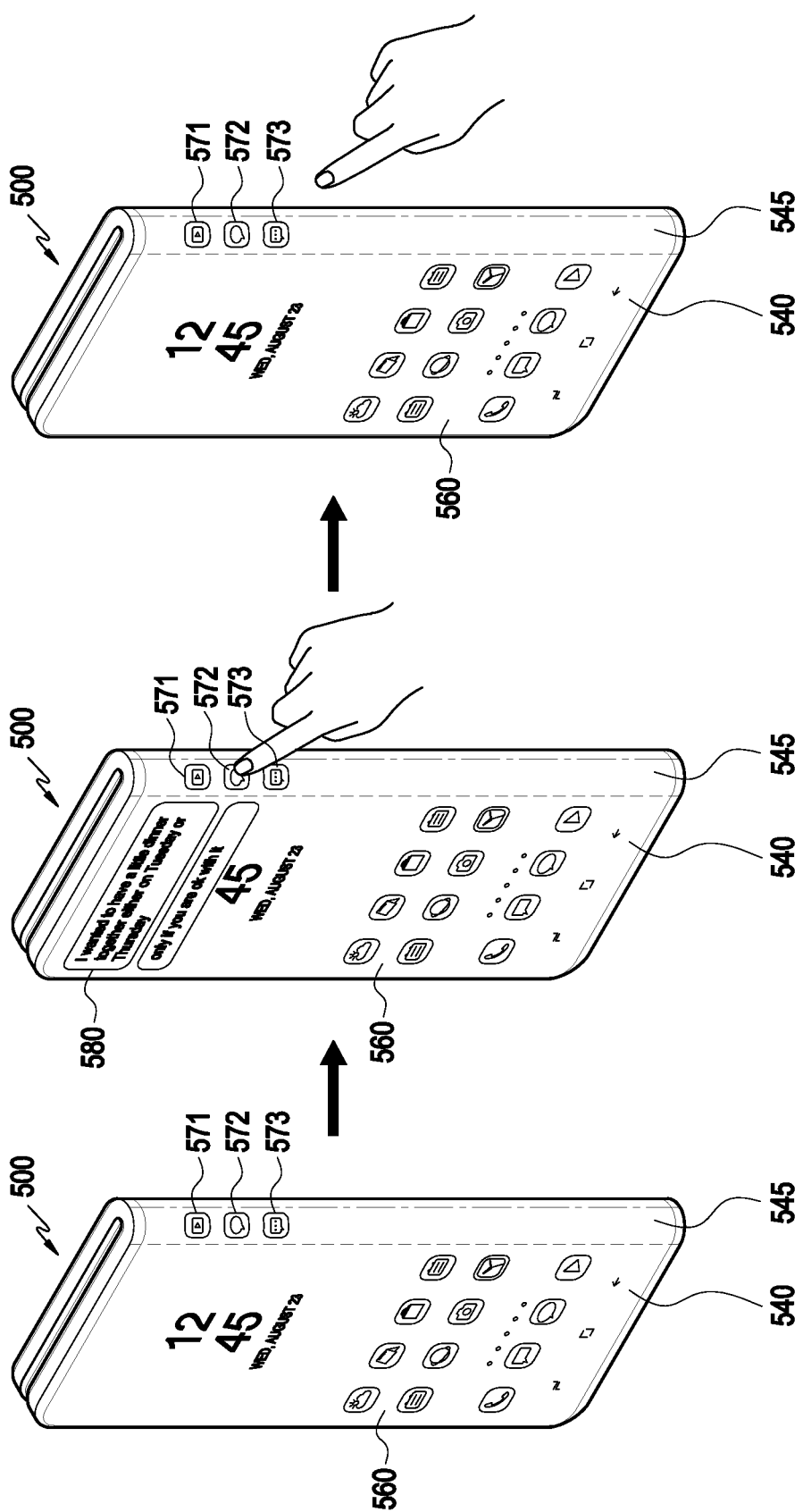
FIG. 5 is a view illustrating operations of an electronic device according to various embodiments.

FIG. 5 is a view illustrating operations of an electronic device according to various embodiments.

Referring to FIG. 5, an electronic device 500 (e.g., the electronic device 300 of FIG. 3), in the folded state, may display a first screen 560 in a first display area 540 (e.g., the first display area 340 of FIG. 3) and a plurality of objects 571, 572, and 573 in a first portion 545 of a third display area (e.g., the third display area 343 of FIG. 3). For example, in response to a notification for at least one application, the electronic device 500 may display a plurality of objects 571, 572, and 573 corresponding to the corresponding notifications.

According to various embodiments, the electronic device 500 may obtain a touch input to a specific object 572 among the plurality of objects 571, 572, and 573. The electronic device 500 may identify the attribute of the touch input. For example, the electronic device 500 may identify whether the touch input has a first attribute or a second attribute. Further, the electronic device 500 may identify the type and direction of the touch input.

Figure 6:
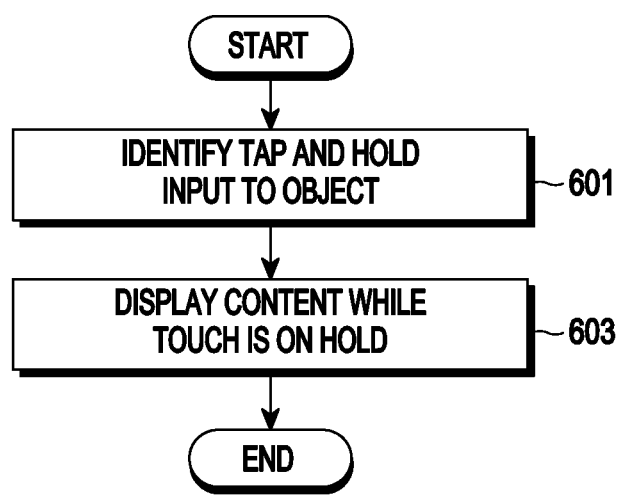
FIG. 6 is a flowchart illustrating operations of an electronic device as described in connection with 5, according to various embodiments.

FIG. 6 is a flowchart illustrating operations of an electronic device as described in connection with 5, according to various embodiments.

Referring to FIGS. 5 and 6, in operation 601, the electronic device 500 may identify the touch input as a tap and hold input. For example, since the tap and hold input is detected only from the first display area 540, it may be a touch input having the first attribute. Further, the touch and hold input may be a long press input.

In operation 603, the electronic device 500 may display a content 580 of the application while the tap input to a specific object 572 is on hold. For example, the content 580 of the application may be displayed, overlapping the first screen 560. The content 580 of the application may include the content of a notification of the application (e.g., the content of a newly identified notification). For example, when the application is a messenger application, the content 580 of the application may include a conversation of the messenger.

According to various embodiments, if the tap and hold input on the specific object 572 is released, the electronic device 500 may stop displaying the content 580. The electronic device 500 may maintain the display of the plurality of objects 571, 572, and 573 even after displaying the content 580. Accordingly, the electronic device 500 may display the content 580 of the corresponding application while the tap input to the specific object 572 is on hold regardless of the number of times. Or, after the content 580 is displayed, the electronic device 500 may display only objects 571 and 573 except for the specific object 572 corresponding to the content 580 in the first portion 545.

By use of the above-described function, the electronic device 500 may conveniently provide a notification or content for the application to the user.

Figure 7:
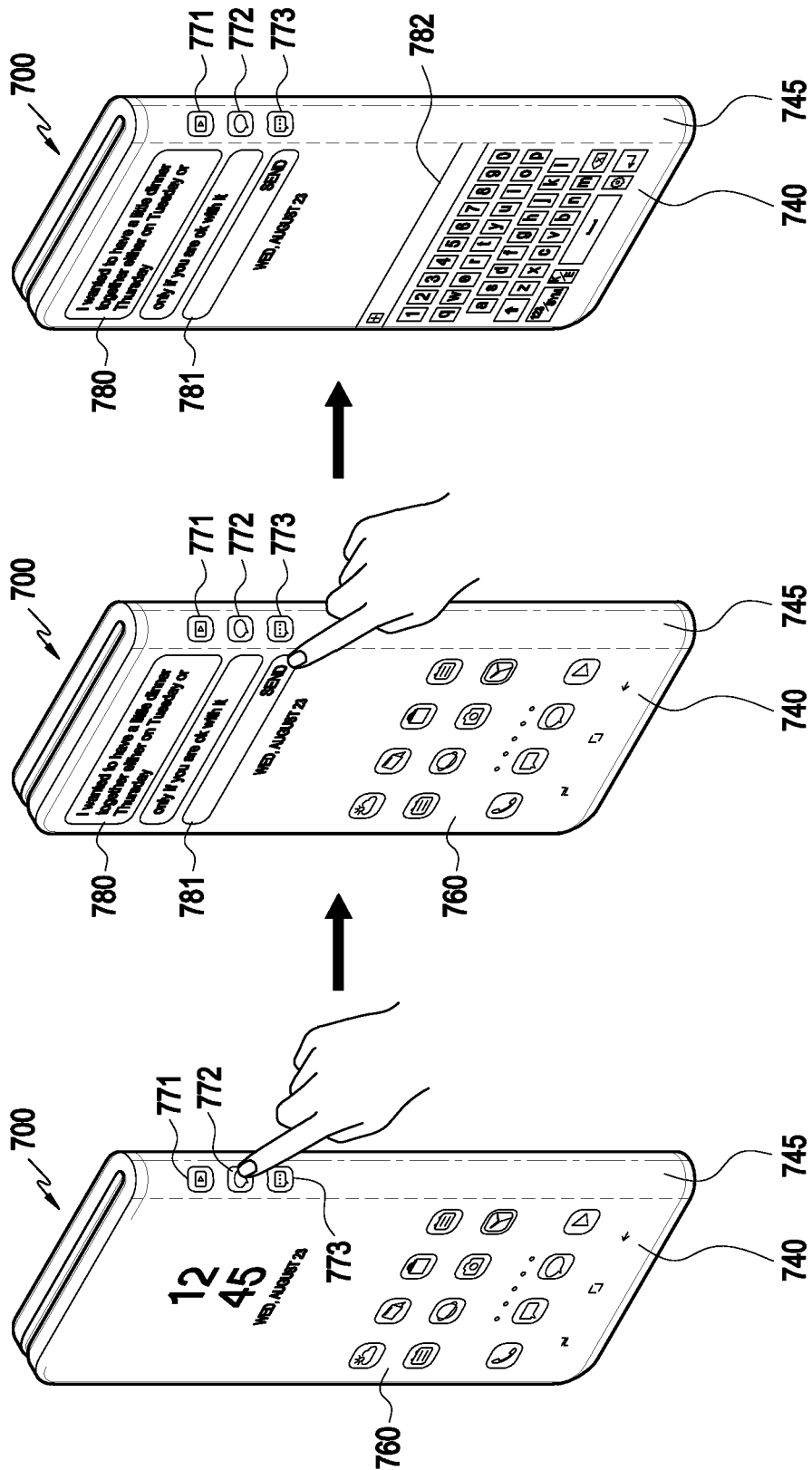
FIG. 7 is a view illustrating operations of an electronic device according to various embodiments.

FIG. 7 is a view illustrating operations of an electronic device according to various embodiments.

Referring to FIG. 7, an electronic device 700 (e.g., the electronic device 300 of FIG. 3), in the folded state, may display a first screen 760 in a first display area 740 (e.g., the first display area 340 of FIG. 3) and a plurality of objects 771, 772, and 773 in a first portion 745 of a third display area (e.g., the third display area 343 of FIG. 3). For example, in response to a notification for at least one application, the electronic device 700 may display a plurality of objects 771, 772, and 773 corresponding to the notifications.

According to various embodiments, the electronic device 700 may obtain a touch input to a specific object 772 among the plurality of objects 771, 772, and 773. The electronic device 700 may identify the attribute of the touch input. For example, the electronic device 700 may identify whether the touch input has a first attribute or a second attribute. Further, the electronic device 700 may identify the type and direction of the touch input.

Figure 8:
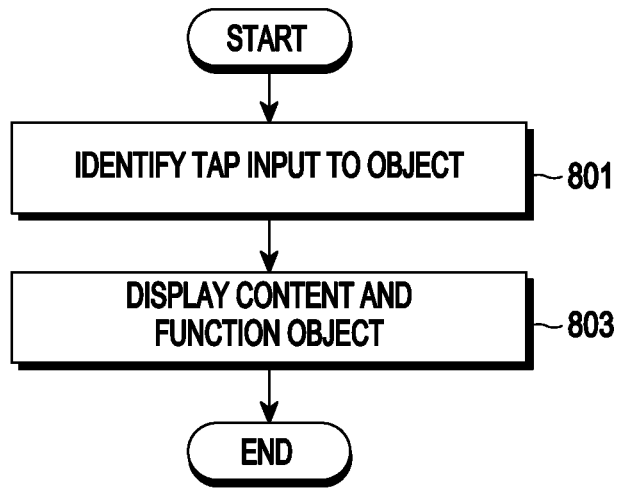
FIG. 8 is a flowchart illustrating operations of an electronic device as described in connection with 7, according to various embodiments.

FIG. 8 is a flowchart illustrating operations of an electronic device as described in connection with 7, according to various embodiments.

Referring to FIGS. 7 and 8, in operation 801, the electronic device 700 may identify the touch input as a tap input. For example, since the tap input is detected only from the first display area 740, it may have the first attribute.

In operation 803, the electronic device 700 may display a function object 781 for performing the function of the application and the content 780 of the application in response to the tap input to a specific object 772. For example, the content 780 and function object 781 of the application may be displayed, overlapping the first screen 760. The content 780 of the application may include the content of a notification of the application (e.g., the content of a newly identified notification). The function object 781 may include an object (e.g., an action button) for responding to the content of the notification of the application. For example, when the application is a messenger application, the content 780 of the application may include a conversation of the messenger. The function object 781 may include an object (e.g., an action button) for responding to the messenger conversation. For example, if a touch input to the action button by the user is identified, the electronic device 700 may display a keyboard screen 782 for inputting and transmitting the conversation content in the first display area 740.

According to various embodiments, if a touch input (e.g., a tap input) to the specific object 772 is identified again after the content 780 and the function object 781 are displayed, the electronic device 700 may stop displaying the content 580. At this time, even after the content 780 and the function object 781 are displayed, the electronic device 700 may display a plurality of objects in the first portion 745. Or, after the content 780 and the function object 781 are displayed, the electronic device 700 may display objects 771 and 773, except for the specific object 772 among the plurality of objects 771, 772, and 773, in the first portion 745.

By use of the above-described function, the electronic device 700 may conveniently provide a notification or content for the application to the user.

According to various embodiments, the electronic device 500 or 700 may set whether to display content for a specific object in response to a tap and hold input or tap input to the specific object displayed in the first portion 545 or 745. For example, the electronic device 500 or 700 may be configured to display content for an object in response to a tap and hold input to the object according to a setting of the processor (the processor 120 of FIG. 1) or the user. At this time, the content for the corresponding object may be displayed only while the hold on the object is maintained. Or, the electronic device 500 or 700 may be configured to display the content for the corresponding object in response to a tap and hold input to the object according to the setting of the processor or the user. At this time, if a tap input to the object is detected, content for the corresponding object may be displayed.

Figure 9:
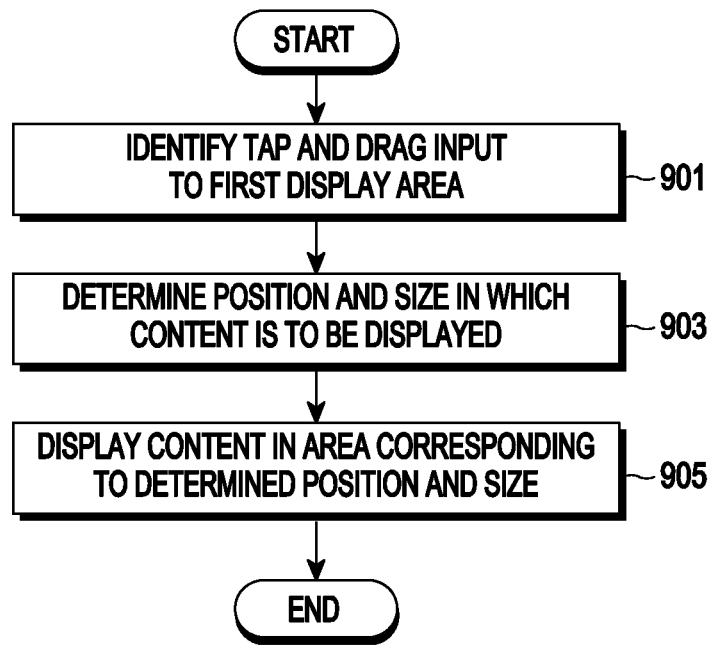
FIG. 9 is a flowchart illustrating operations of an electronic device according to various embodiments.

FIG. 9 is a flowchart illustrating operations of an electronic device according to various embodiments.

Figure 10A:
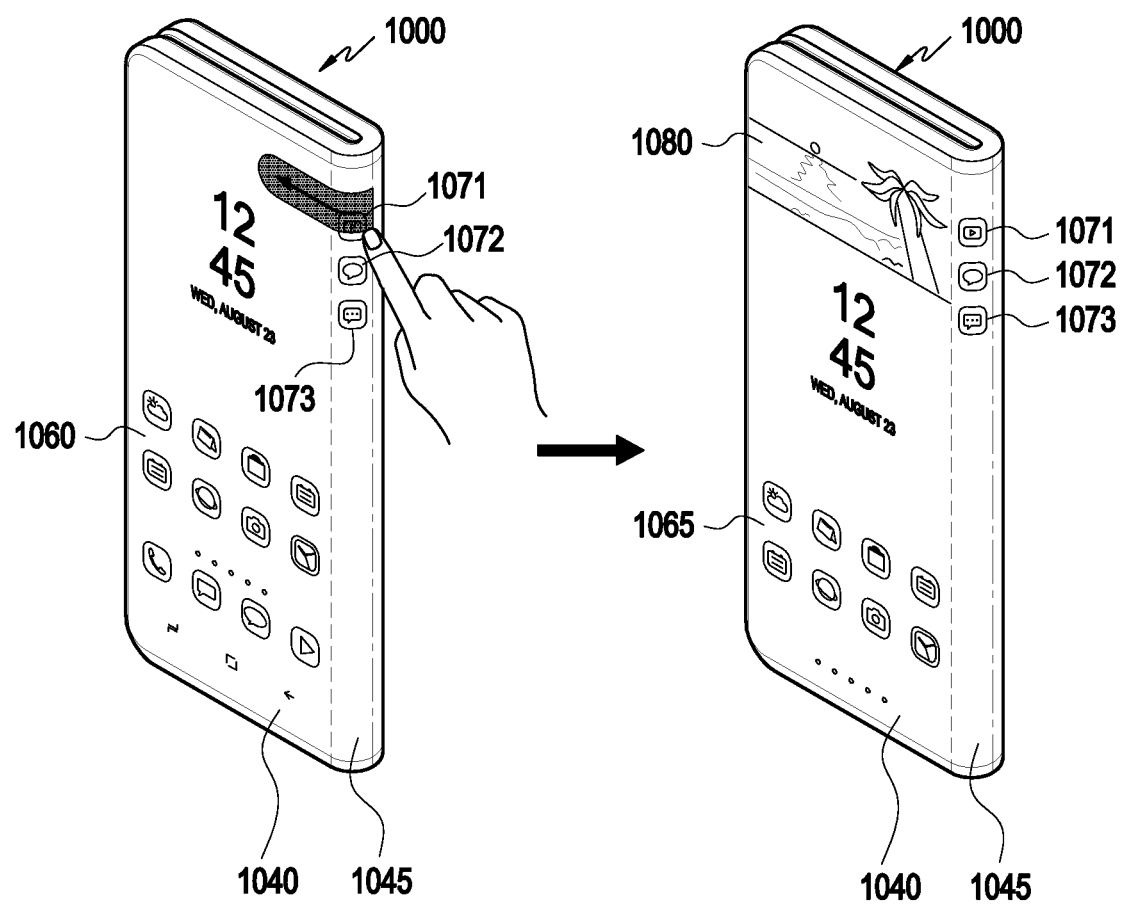
FIGS. 10A, 10B, and 10C are views illustrating operations of an electronic device as described in connection with FIG. 9, according to various embodiments.
Figure 10B:
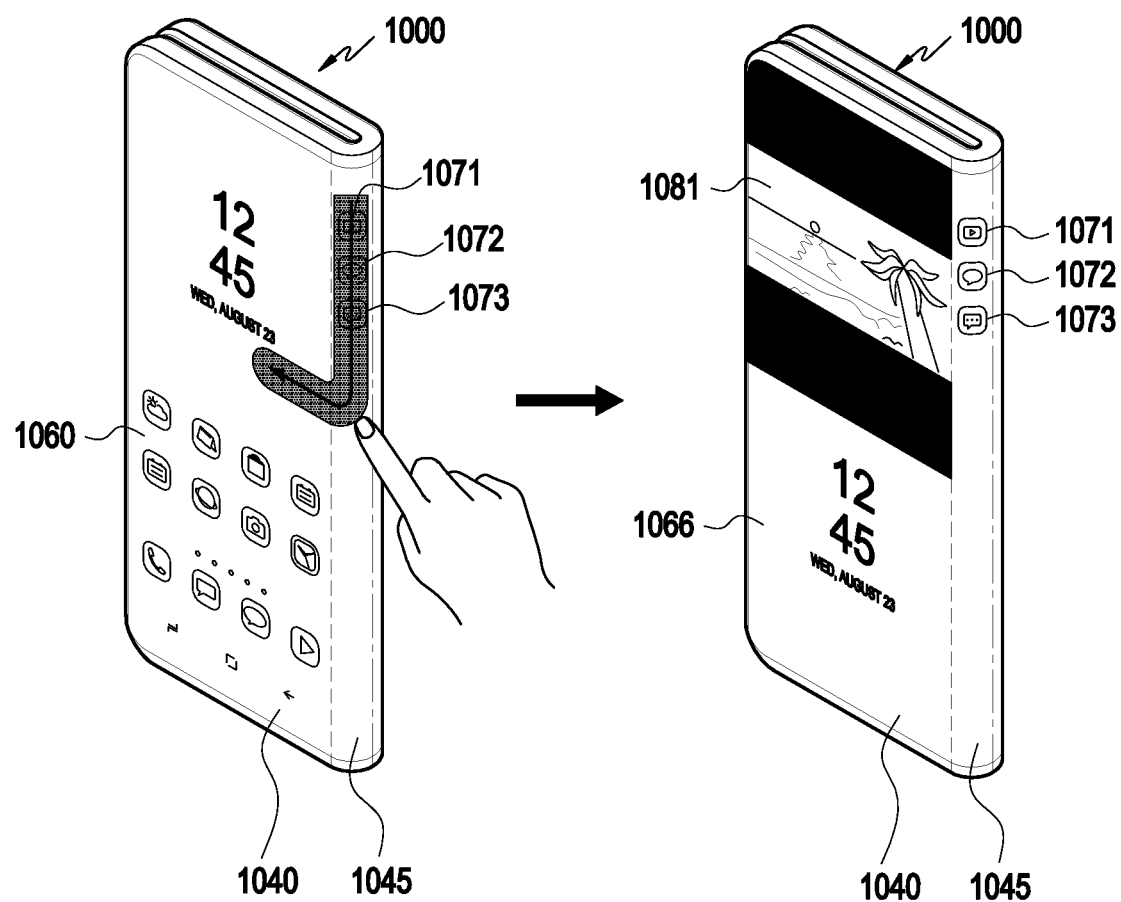
Figure 10C:
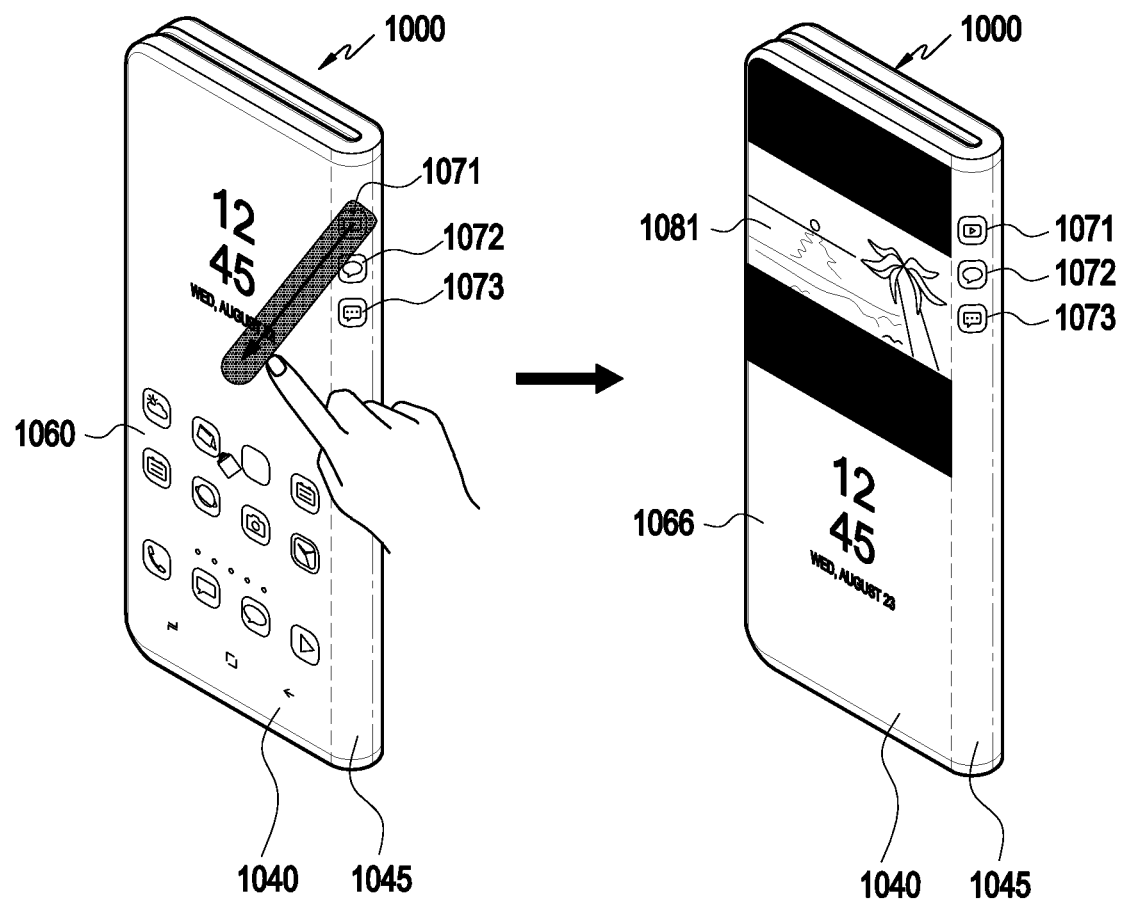

FIGS. 10A to 10C are views illustrating operations of an electronic device as described in connection with FIG. 9, according to various embodiments.

Referring to FIGS. 9 and 10A to 10C, an electronic device 1000 (e.g., the electronic device 300 of FIG. 3), in the folded state, may display a first screen 1060 in a first display area 1040 (e.g., the first display area 340 of FIG. 3) and a plurality of objects 1071, 1072, and 1073 in a first portion 1045 of a third display area (e.g., the third display area 343 of FIG. 3). For example, in response to a notification for at least one application, the electronic device 1000 may display a plurality of objects 1071, 1072, and 1073 corresponding to the notifications.

According to various embodiments, the electronic device 1000 may obtain a touch input to a specific object 1071 among the plurality of objects 1071, 1072, and 1073. The electronic device 1000 may identify the attribute of the touch input. For example, the electronic device 1000 may identify whether the touch input has a first attribute or a second attribute. Further, the electronic device 1000 may identify the type and direction of the touch input.

Referring to FIGS. 9 and 10A to 10C, in operation 901, the electronic device 1000 may identify a touch input as a tap and drag input (or tap and swipe input). For example, since the tap and drag input of FIGS. 10A to 10C is detected only from the first display area 1040, it may have the first attribute. For example, since the direction of the drag input is toward the first display area 1040, the tap and drag input may have the first attribute. The electronic device 1000 may identify the drag direction (or swipe direction) of the tap and drag input.

In operation 903, the electronic device 1000 may determine the position and size in which the content of the application is to be displayed, based on the drag direction. For example, the electronic device 1000 may determine the area (e.g., the size of a window) in which the content of the application is to be displayed, based on the direction and distance of the drag of the object after tapped.

Referring to FIG. 10A, the electronic device 1000 may identify a drag input in a specific direction after a specific object 1071 among the plurality of objects 1071, 1072, and 1073 is tapped (e.g., a long press). The electronic device 1000 may identify that the tap and drag input is dragged in the left direction. The electronic device 1000 may display content 1080 in an upper area of the screen based on the drag direction. For example, the screen size of the content 1080 may be determined in a ratio optimized for the corresponding content 1080. Or, the screen size of the content 1080 may be a preset size.

Referring to FIG. 10B, the electronic device 1000 may identify a tap and drag input to a specific object 1071 among the plurality of objects 1071, 1072, and 1073. The electronic device 1000 may identify that the tap and drag input is dragged downward and dragged to the left after the specific object 1071 is tapped (e.g., a long press). The electronic device 1000 may determine the area in which the content 1081 is to be displayed, based on the drag direction and distance. For example, the electronic device 1000 may determine that the area in which the content 1081 is to be displayed is an area from an upper end of the screen to where the tap and drag input is released. For example, the screen size of the content 1081 may be determined in a ratio optimized for the corresponding content 1081. Or, the screen size of the content 1081 may be adjusted according to the determined area.

Referring to FIG. 10C, the electronic device 1000 may identify that the tap and drag input is dragged in the lower and left direction after the specific object 1071 is tapped (e.g., a long press). The electronic device 1000 may determine the area in which the content 1081 is to be displayed, based on the drag direction and distance. For example, the electronic device 1000 may determine that the area in which the content 1081 is to be displayed is an area from an upper end of the screen to where the tap and drag input is released. For example, the screen size of the content 1081 may be determined in a ratio optimized for the corresponding content 1081. Or, the screen size of the content 1081 may be adjusted according to the determined area.

In operation 905, the electronic device 1000 may display the content 1081 of the application in the area corresponding to the determined position and size. The electronic device 1000 may move the existing position of display of the first screen 1060, under the area where the content 1081 of the application is displayed, to allow the existing first screen 1060 not to overlap the content 1080 or 1081 of the application. In other words, the electronic device 1000 may display the second screen 1065 or 1066 corresponding to the first screen 1060 in the remaining area different from the area where the content of the application is displayed, in the first display area 1040. For example, the size or ratio of the second screen 1065 or 1066 may be adjusted depending on the size of its underneath area.

By use of the above-described function, the electronic device 1000 may conveniently provide a notification or content for the application to the user.

Figure 11:
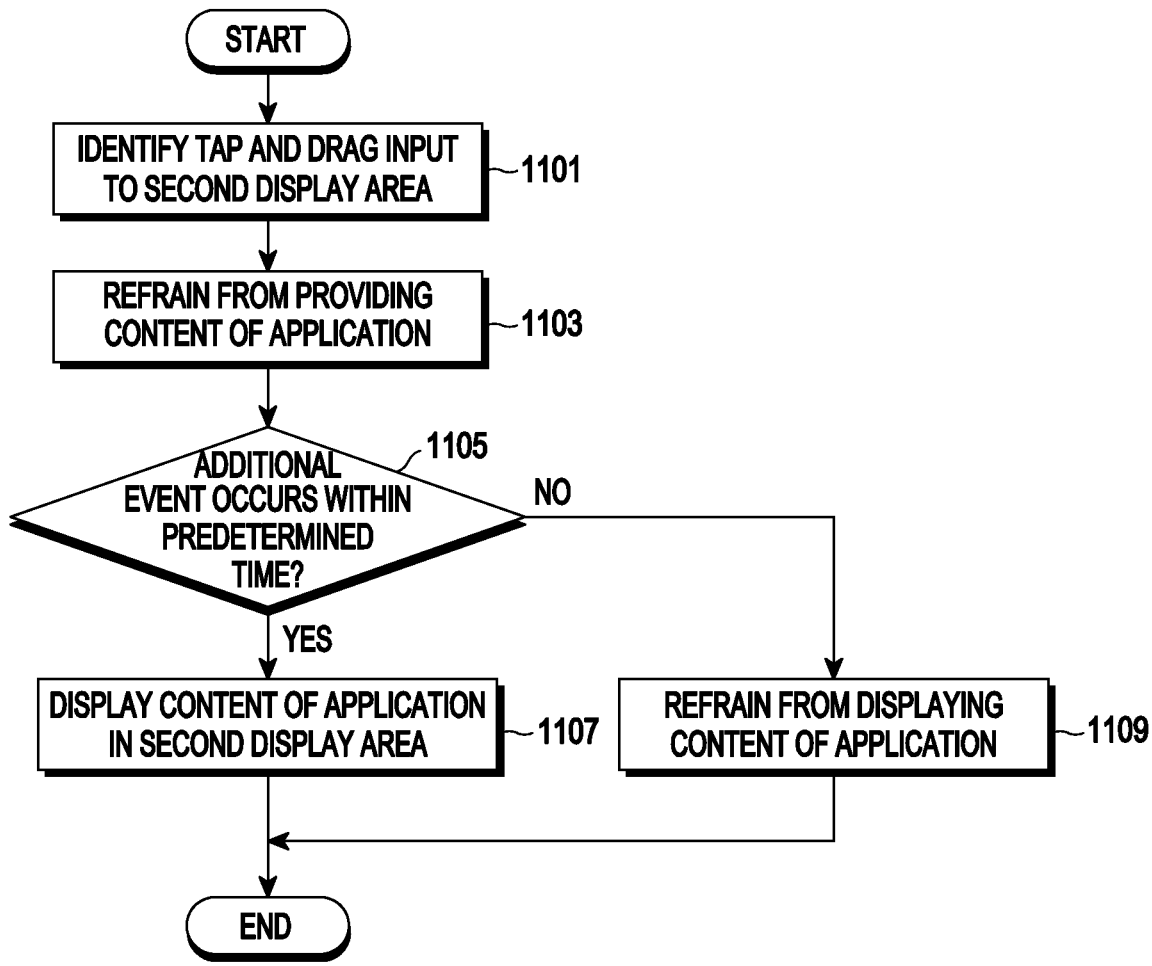
FIG. 11 is a flowchart illustrating operations of an electronic device according to various embodiments.

FIG. 11 is a flowchart illustrating operations of an electronic device according to various embodiments.

Figure 12A:
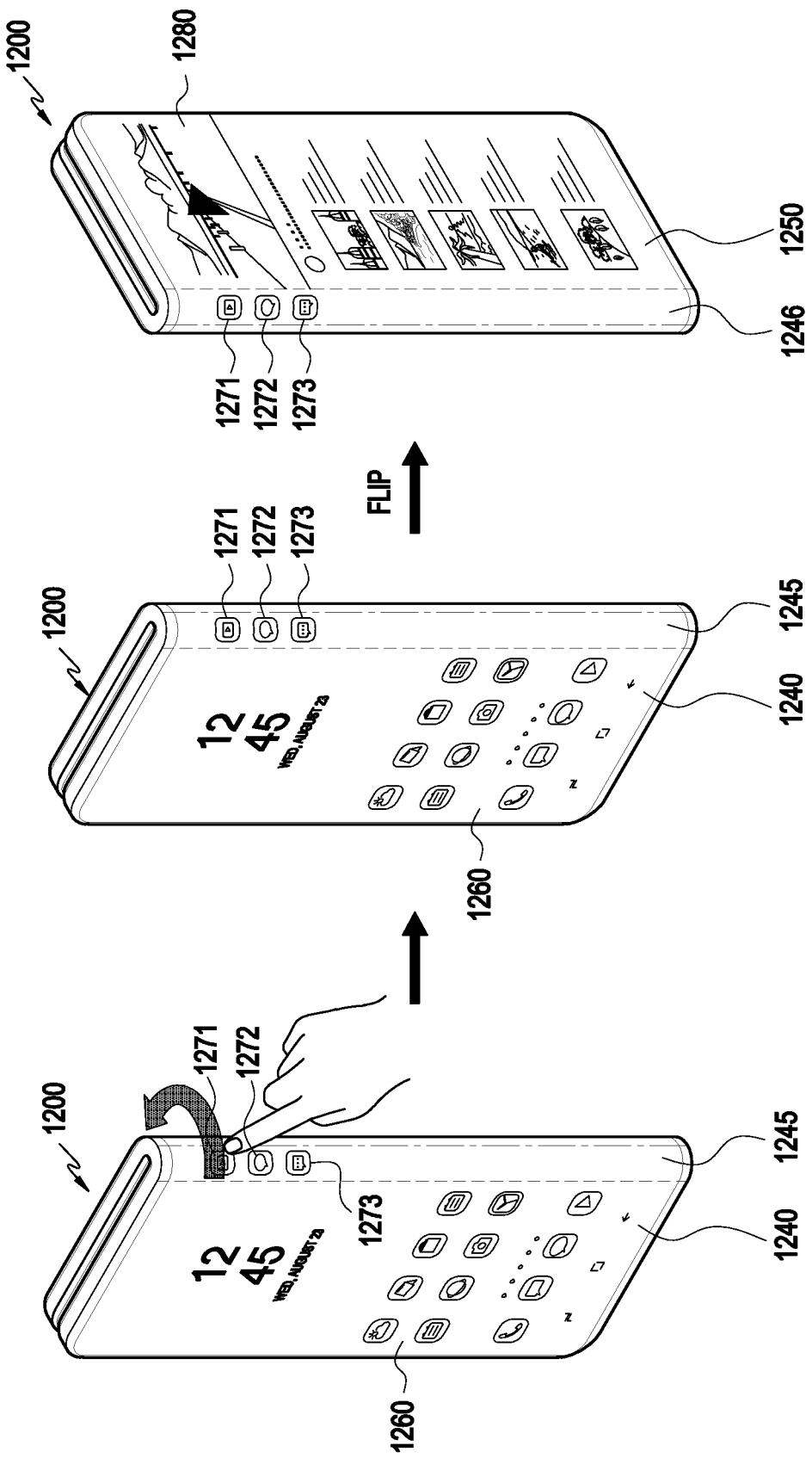
FIGS. 12A and 12B are views illustrating operations of an electronic device as described in connection with FIG. 11, according to various embodiments.
Figure 12B:
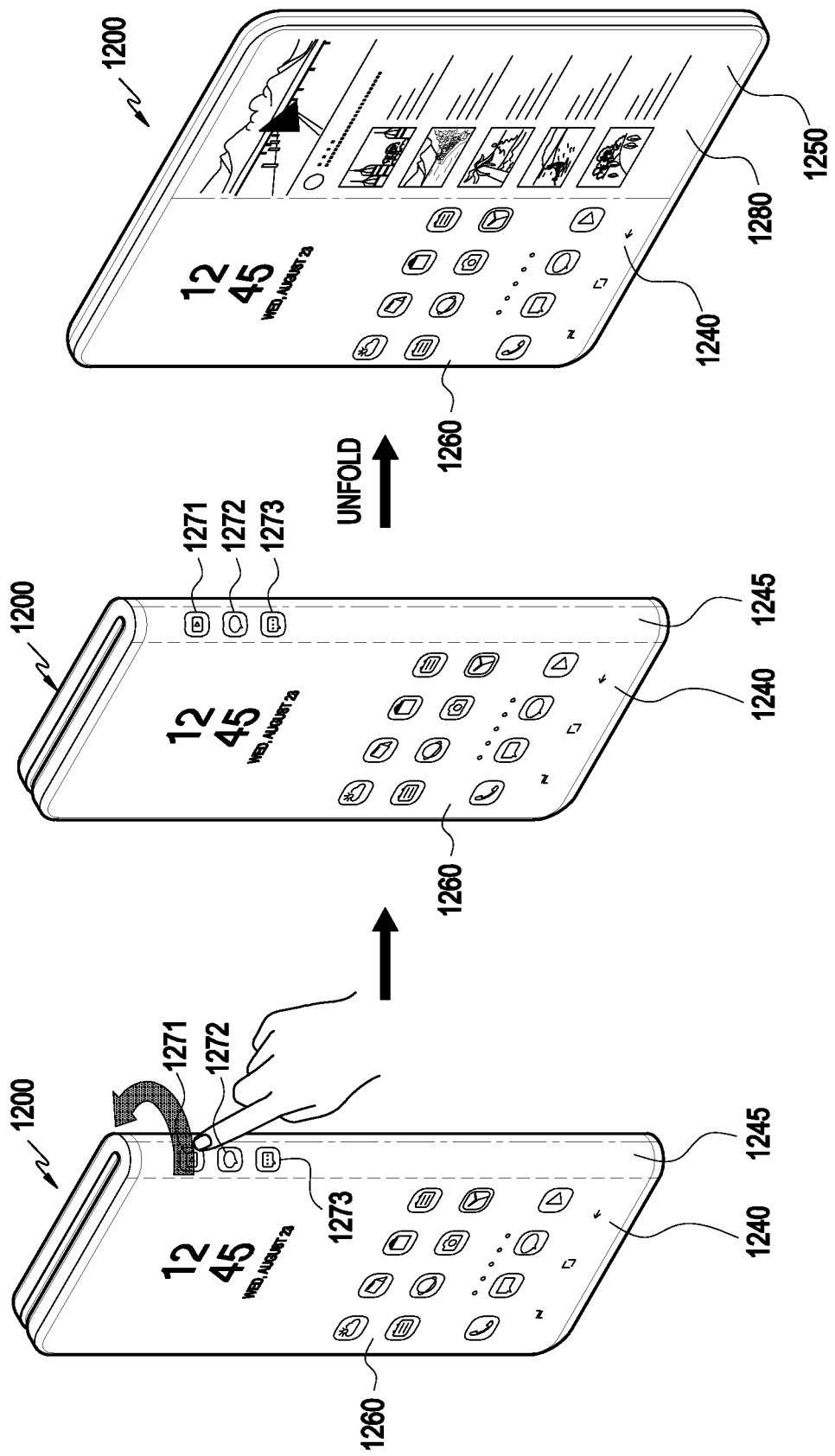

FIGS. 12A and 12B are views illustrating operations of an electronic device as described in connection with FIG. 11, according to various embodiments.

Referring to FIGS. 11 and 12A and 12B, an electronic device 1200 (e.g., the electronic device 300 of FIG. 3), in the folded state, may display a first screen 1260 in a first display area 1240 (e.g., the first display area 340 of FIG. 3) and a plurality of objects 1271, 1272, and 1273 in a first portion 1245 of a third display area (e.g., the third display area 343 of FIG. 3).

According to various embodiments, the electronic device 1000 may obtain a touch input to a specific object 1271 among the plurality of objects 1271, 1272, and 1273. The electronic device 1200 may identify the attribute of the touch input. For example, the electronic device 1200 may identify whether the touch input has a first attribute or a second attribute. Further, the electronic device 1200 may identify the type and direction of the touch input.

Referring to FIGS. 11 and 12A and 12B, in operation 1101, an electronic device 1200 may identify a touch input as a tap and drag input (or a tap and swipe input) to the second display area 1250 (e.g., the second display area 350 of FIG. 3). For example, since the tap and drag input of FIGS. 12A and 12B is dragged from a specific object 1271 to the second display area 1250, it may be detected from the second display area 1250. For example, since the direction of the drag input is toward the second display area 1250, the tap and drag input may have the second attribute.

In operation 1103, the electronic device 1200 may refrain from providing (or displaying) content of the application corresponding to the specific object 1271 based on the attribute of the touch input (e.g., a tap and drag input). For example, the electronic device 1200 may refrain from displaying the content of the application corresponding to the specific object 1271 until before an additional event occurs. Further, the electronic device 1200 may refrain from executing the application corresponding to the specific object 1271 until before an additional event occurs. For example, the additional event may include an event where the electronic device 1200 is flipped as shown in FIG. 12A. Further, the additional event may include an event (e.g., an unfold event) where the electronic device 1200 (or the flexible display of the electronic device 1200) changes into the unfolded state as shown in FIG. 12B.

In operation 1105, the electronic device 1200 may identify whether an additional event occurs within a predetermined time. For example, the predetermined time may be set by the user or automatically by the processor (e.g., the processor 120 of FIG. 1) of the electronic device 1200.

In operation 1107, if an additional event occurs within the predetermined time (Yes in 1105), the electronic device 1200 may display the content 1280 of the application in the second display area 1250. Further, if the occurrence of the additional event is detected, the electronic device 1200 may execute the application corresponding to the specific object 1271.

In operation 1109, if an additional event does not occur within the predetermined time (No in 1105), the electronic device 1200 may refrain from displaying the content 1280 of the application in the second display area 1250.

According to various embodiments, referring to FIG. 12A, if a tap and drag input to the second display area 1250 is identified, and the electronic device 1200 is flipped within a predetermined time, the electronic device 1200 may display the content 1280 of the application in the second display area 1250. For example, the electronic device 1200 may display the content 1280 (e.g., an execution screen) of the application in the entire second display area 1250. At this time, in the folded state, the electronic device 1200 may display a plurality of objects 1271, 1272, and 1273 in the second portion 1246 of the third display area (e.g., the third display area 343 of FIG. 3) of the second display area 1250.

According to various embodiments, referring to FIG. 12B, if a tap and drag input to the second display area 1250 is identified, and the electronic device 1200 is unfolded within a predetermined time, the electronic device 1200 may display the content 1280 of the application in the second display area 1250. For example, the electronic device 1200 may display the execution screen of the application corresponding to the specific object 1271 in the entire second display area 1250. At this time, the electronic device 1200 may display the first screen 1260 in the first display area 1240.

According to various embodiments, based on a touch input having a first attribute (e.g., a drag input to the first display area of the front surface), to an object (e.g., a notification object) being detected, the electronic device 1200 may immediately display the content for the corresponding object in the first display area 1240 of the front surface and, based on a touch input having a second attribute (e.g., a drag input to the second display area of the rear surface), to the object, and a flip or unfolding of the electronic device 1200 being detected, display the content for the corresponding object in the second display area 1250 of the rear surface.

By use of the above-described function, the electronic device 1200 may conveniently provide a notification or content for the application to the user. Further, by use of the above-described function, the electronic device 1200 may conveniently provide a plurality of execution screens.

Figure 13:
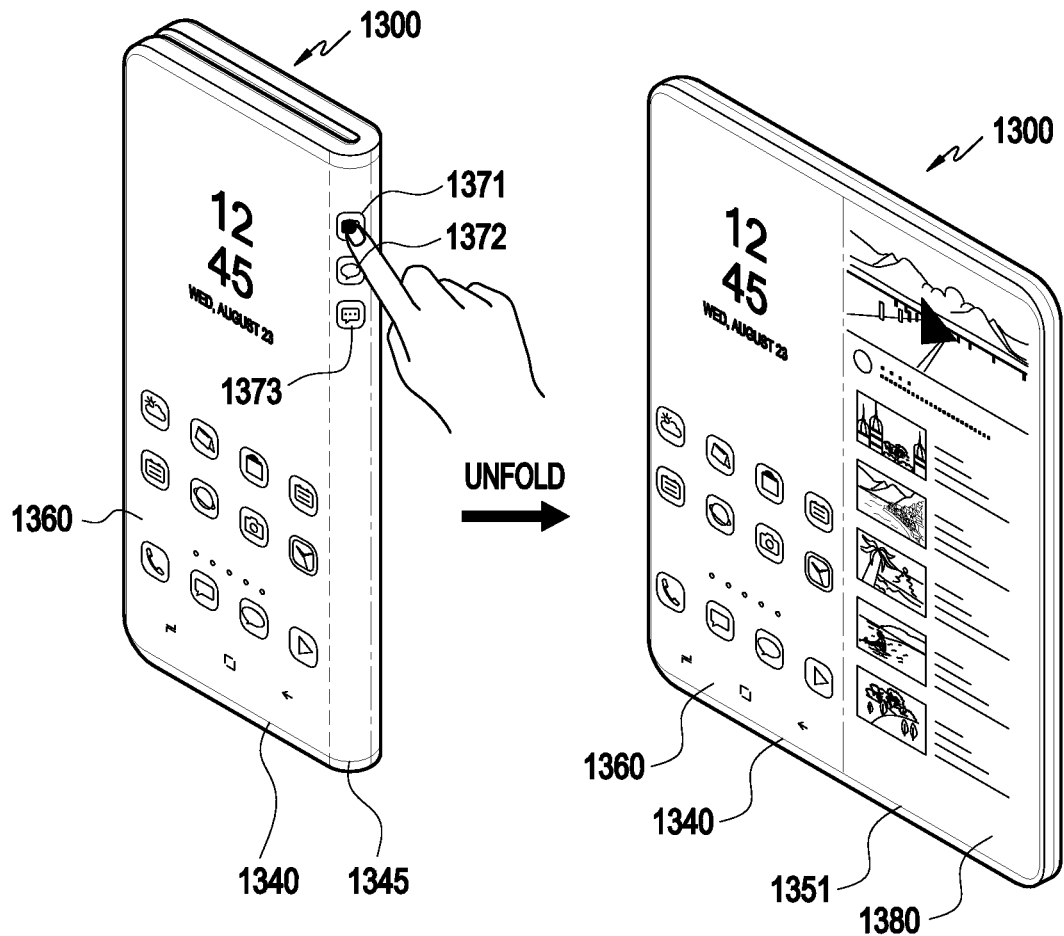
FIG. 13 is a flowchart illustrating operations of an electronic device according to various embodiments.

FIG. 13 is a flowchart illustrating operations of an electronic device according to various embodiments.

Figure 14:
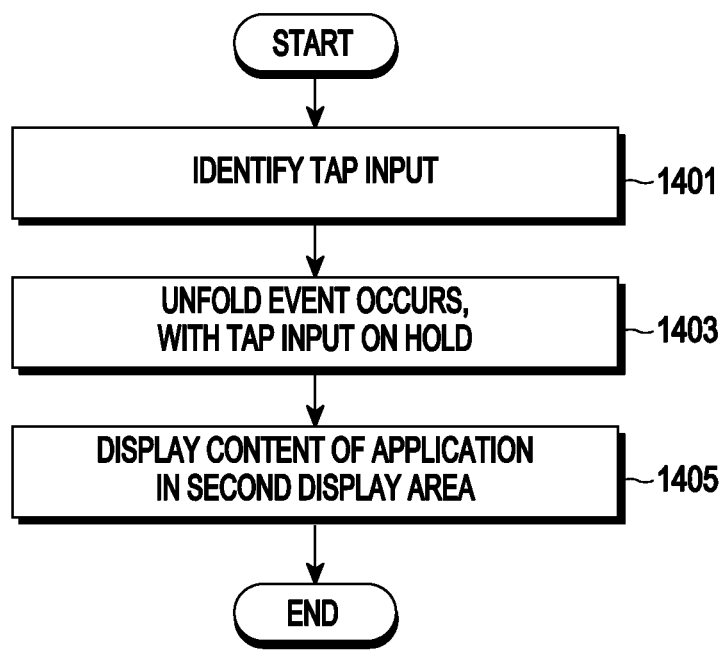
FIG. 14 is a view illustrating operations of an electronic device as described in connection with 13, according to various embodiments.

FIG. 14 is a view illustrating operations of an electronic device as described in connection with 13, according to various embodiments.

Referring to FIGS. 13 and 14, an electronic device 1300 (e.g., the electronic device 300 of FIG. 3), in the folded state, may display a first screen 1360 in a first display area 1340 (e.g., the first display area 340 of FIG. 3) and a plurality of objects 1371, 1372, and 1373 in a first portion 1345 of a third display area (e.g., the third display area 343 of FIG. 3).

According to various embodiments, the electronic device 1300 may obtain a touch input to a specific object 1371 among the plurality of objects 1371, 1372, and 1373. The electronic device 1300 may identify the attribute of the touch input. For example, the electronic device 1300 may identify whether the touch input has a first attribute or a second attribute. Further, the electronic device 1300 may identify the type and direction of the touch input.

In operation 1401, the electronic device 1300 may identify the touch input as a tap and hold input.

In operation 1403, the electronic device 1300 may identify an occurrence of an event where the electronic device 1300 (or the flexible display of the electronic device 1300) is unfolded, with a tap input on hold.

In operation 1405, if an event where the electronic device 1300 is unfolded (or an event where it changes into the unfolded state), with the tap input on hold, the electronic device 1300 may display the content 1380 of the application corresponding to a specific object 1371 in the second display area 1351. For example, the electronic device 1300 may display the execution screen of the application corresponding to the specific object 1371 in the entire second display area 1351. At this time, the electronic device 1300 may display the first screen 1360 in the first display area 1340.

By use of the above-described function, the electronic device 1300 may conveniently provide a notification or content for the application to the user. Further, by use of the above-described function, the electronic device 1200 may conveniently provide a plurality of execution screens.

Figure 15:
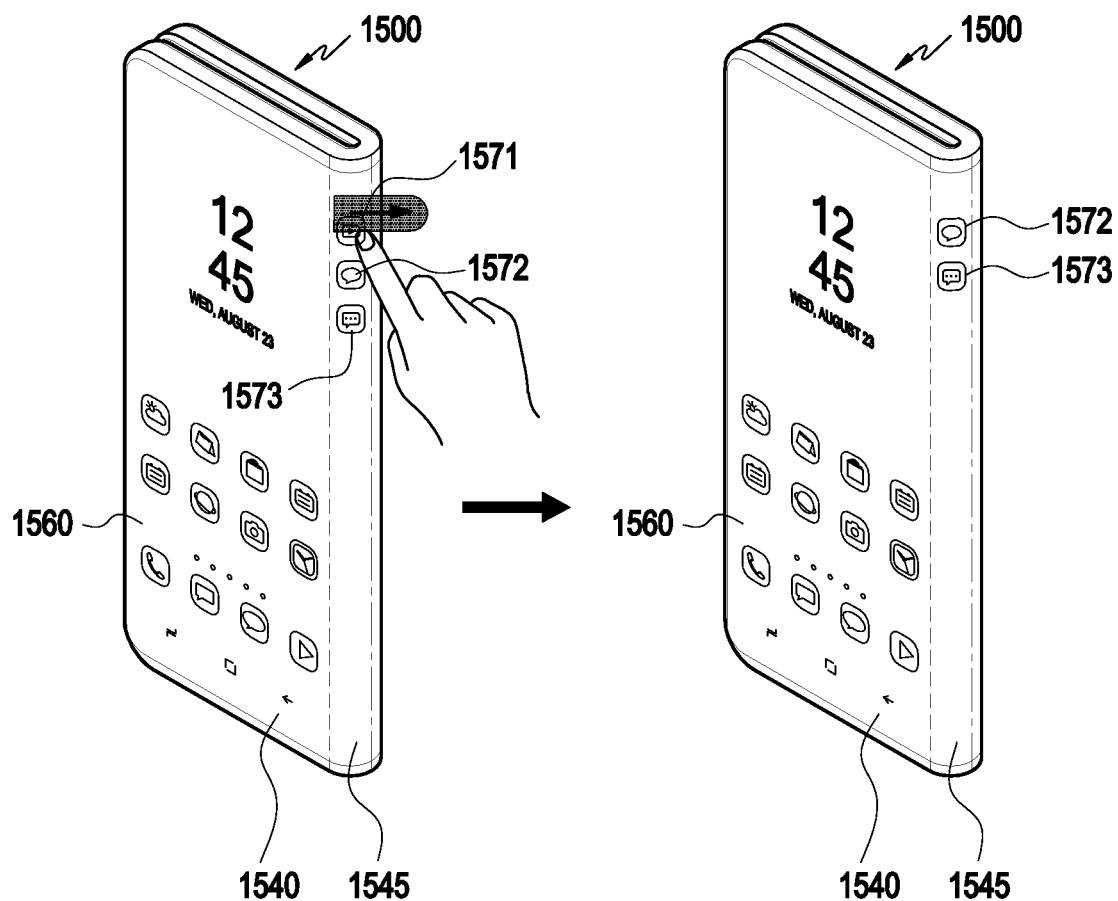
FIG. 15 is a flowchart illustrating operations of an electronic device according to various embodiments.

FIG. 15 is a flowchart illustrating operations of an electronic device according to various embodiments.

Figure 16:
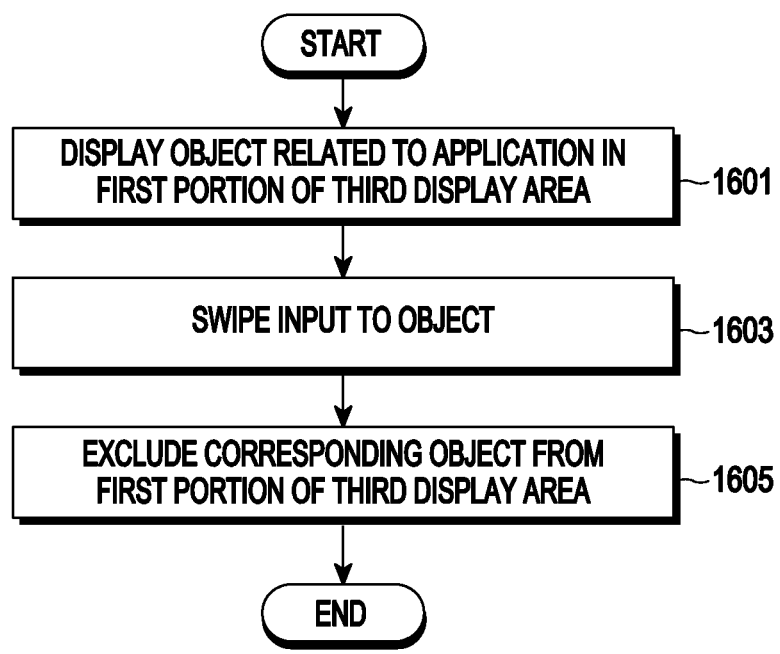
FIG. 16 is a view illustrating operations of an electronic device as described in connection with 15, according to various embodiments.

FIG. 16 is a view illustrating operations of an electronic device as described in connection with 15, according to various embodiments.

Referring to FIG. 15, in the folded state, an electronic device 1500 (e.g., an electronic device 300 of FIG. 3) may display a first screen 1560 in a first display area 1540 (e.g., the first display area 340 of FIG. 3).

Referring to FIGS. 15 and 16, in operation 1601, in the folded state, an electronic device 1500 (e.g., an electronic device 300 of FIG. 3) may display objects 1571, 1572, and 1573 related to an application in a first portion 1545 of a third display area (e.g., the third display area 343 of FIG. 3). Meanwhile, the positions in which the objects 1571, 1572, and 1573 related to the application are displayed as shown in FIG. 15 are merely for convenience of description, and the positions in which the objects 1571, 1572, and 1573 are displayed may not be limited thereto.

According to various embodiments, if a touch input to a specific object 1571 among the objects 1571, 1572, and 1573 is obtained, the electronic device 1500 may identify the attribute of the touch input. The electronic device 1500 may identify the type and direction of the touch input.

In operation 1603, the electronic device 1500 may identify that the touch input is a swipe input to the specific object 1571. Further, the electronic device 1500 may identify that the swipe input is swiping the specific object 1571 in the right direction.

In operation 1605, the electronic device 1500 may exclude the specific object 1571 from the first portion 1545 in response to the swipe input to the specific object 1571. For example, the electronic device 1500 may exclude the corresponding object 1571 from the first portion 1545 in response to the swipe input to the specific object 1571 in the right direction. Or, the electronic device 1500 may also exclude the corresponding object 1571 from the first portion 1545 in response to the swipe input to the specific object 1571 regardless of the direction. Accordingly, the electronic device 1500 may display only the other objects 1572 and 1573 than the specific object 1571 among the objects 1571, 1572, and 1573 in the first portion 1545.

As described above, the electronic device 1500 may provide the user with the function of conveniently organizing and managing the object indicating the notification for the application.

According to various embodiments, an electronic device may comprise a foldable housing including a hinge structure, a flexible display including a first display area, a second display area, and a third display area between the first display area and the second display area and exposed through the foldable housing, and a processor provided in the foldable housing. The processor may be configured to display a first screen in the first display area and an object related to an application in a first portion of the third display area, in a folded state in which the flexible display is folded through the hinge structure to allow the first display area and the second display area of the flexible display to be exposed to an outside, identify an attribute of a touch input based on the touch input to the object, based on the attribute of the touch input being identified to be a first attribute, display a content of the application in the first display area, and based on the attribute of the touch input being identified to be a second attribute, and an additional event for the second display area being identified, display the content in the second display area.

The processor may be configured to, based on the attribute of the touch input being a touch and hold to the object, display the content in at least a portion of the first display area while the hold on the object is maintained.

The processor may be configured to, based on the attribute of the touch input being a tap input to the object, display an object for performing a function for the content and the content in at least a portion of the first display area.

The processor may be configured to, based on the attribute of the touch input being a drag input of touching the object and then moving the object to the first display area, identify a position and size of an area in which the content is to be displayed, based on a direction of the drag input.

The processor may be configured to display the content in an area corresponding to the identified position and size of the first display area and display a second screen corresponding to the first screen in a remaining area of the first display area.

The processor may be configured to display the content in the second display area based on the flexible display being changed from the folded state to an unfolded state while the touch input to the object is maintained.

The processor may be configured to exclude the object from the first portion based on the attribute of the touch input being a swipe input to the object.

The processor may be configured to, based on the attribute of the touch input being a drag input of touching the object and then moving the object to the second display area, display the content in the second display area based on the electronic device being flipped within a preset time.

The processor may be configured not to display the content in the second display area based on the electronic device not being flipped within the preset time.

The processor may be configured to deactivate the second display area in the folded state.

According to various embodiments, a method for operating an electronic device may comprise displaying a first screen in a first portion of a first display area and an object related to an application in a second portion of the first display area, in a folded state in which a flexible display of the electronic device is folded to allow the first display area and a second display area of the flexible display to be exposed to an outside, identifying an attribute of a touch input in response to the touch input to the object, based on the attribute of the touch input being identified to be a first attribute, displaying content of the application in the first display area, and based on the attribute of the touch input being identified to be a second attribute, and an additional event for the second display area being identified, displaying the content in the second display area.

Displaying the content in the first display area may include, based on the attribute of the touch input being a tap input to the object, displaying an object for performing a function for the content and the content in at least a portion of the first portion.

Displaying the content in the first display area may include, based on the attribute of the touch input being a drag input of touching the object and then moving the object to the first display area, identifying a position and size of an area in which the content is to be displayed, based on a direction of the drag input.

Displaying the content in the first display area may include displaying the content in an area corresponding to the determined position and size of the first portion and displaying a second screen corresponding to the first screen in a remaining area of the first portion.

Displaying the content in the second display area may include displaying the content in the second display area based on the flexible display being changed from the folded state to an unfolded state while the touch input to the object is maintained.

The method for operating the electronic device may further comprise excluding the object from the second portion when the attribute of the touch input is a swipe input to the object.

Displaying the content in the second display area may include, based on the attribute of the touch input being a drag input of touching the object and then moving the object to the second display area, displaying the content in the second display area based on the electronic device being flipped within a preset time.

The method may further comprise deactivating the second display area in the folded state.

According to various embodiments, an electronic device may comprise a foldable housing including a hinge structure, a flexible display including a first display area, a second display area, and a third display area between the first display area and the second display area and exposed through the foldable housing, and a memory and a processor provided in the foldable housing. The memory may store instructions that, when executed, enable the processor to display a first screen in the first display area and an object related to an application in a first portion of the third display area, in a folded state in which the flexible display is folded through the hinge structure to allow the first display area and the second display area of the flexible display to be exposed to an outside, identify an attribute of a touch input based on the touch input to the object, based on the attribute of the touch input being identified to be a first attribute, display content of the application in the first display area, and based on the attribute of the touch input being identified to be a second attribute, and an additional event for the second display area being identified, display the content in the second display area.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

While the disclosure has been shown and described with reference to various embodiments thereof, it will be understood by those skilled in the art that various changes in form and details may be made therein without departing from the spirit and the scope of the disclosure as defined by the appended claims and their equivalents.

The invention claimed is:

1. An electronic device comprising:
   a foldable housing including a hinge structure;
   a flexible display;
   a processor; and
   memory storing instructions, that, when executed by the processor, cause the electronic device to:
   display a first screen in a first display area of the flexible display and an object representing an application in a third display area corresponding to the hinge structure of the flexible display, in a folded state of the electronic device in which the flexible display is out-folded through the hinge structure to allow the first display area and a second display area of the flexible display to be exposed to an outside, wherein, in the folded state, the first display area and the second display area face opposite directions,
   identify a touch drag input to the object in the third display area, while the first display area faces a first direction and the second display area faces a second direction opposite to the first direction in the folded state, wherein touch sensing and a screen display of the second display area are deactivated in the folded state while the second display area faces the second direction opposite to the first direction,
   based on identifying that a direction of the touch drag input is from the third display area to the first display area while the first display area faces the first direction in the folded state, display a portion of the first screen and an execution screen of the application related to the object in the first display area,
   based on identifying that the direction of the touch drag input is from the third display area to the second display area while the first display area faces the first direction in the folded state, identify whether the second display area faces the first direction in the folded state,
   based on identifying a direction toward which the second display area faces is changed from the second direction to the first direction in the folded state within a predetermined time after identifying that the direction of the touch drag input is from the third display area to the second display area, activate the second display area and display an execution screen of the application related to the object in the second display area, and
   based on identifying the direction toward which the second display area faces is not changed from the second direction to the first direction in the folded state within the predetermined time after identifying that the direction of the touch drag input is from the third display area to the second display area, refrain from displaying the execution screen of the application related to the object in the second display area.

2. The electronic device of claim 1, wherein the instructions, when executed by the processor, cause the electronic device to, based on identifying a touch and hold input to the object, display content of the application in at least a portion of the first display area while the touch and hold input is maintained on the object is maintained.

3. The electronic device of claim 1, wherein the instructions, when executed by the processor, cause the electronic device to, based on identifying a tap input to the object, display content of the application and an object for performing a function related to the content in at least a portion of the first display area.

4. The electronic device of claim 1, wherein the instructions, when executed by the processor, cause the electronic device to, based on identifying a drag input for moving the object to the first display area, identify a position and size of an area in which content of application is to be displayed, based on a direction of the drag input.

5. The electronic device of claim 4, wherein the instructions, when executed by the processor, cause the electronic device to display the content in an area corresponding to the identified position and size of the first display area and display a portion of the first screen in a remaining area of the first display area.

6. The electronic device of claim 1, wherein the instructions, when executed by the processor, cause the electronic device to display content of application in the second display area based on identifying that a state of the electronic device is changed from the folded state to an unfolded state while a touch input to the object is maintained.

7. The electronic device of claim 1, wherein the instructions, when executed by the processor, cause the electronic device to exclude the object from the third display area based on identifying a swipe input to the object.

8. The electronic device of claim 1, wherein the instructions, when executed by the processor, cause the electronic device to, after identifying that the direction of the touch drag input is from the third display area to the second display area, display the execution of the application related to the object in the second display area based on the electronic device being flipped within a preset time.

9. The electronic device of claim 8, wherein the instructions, when executed by the processor, cause the electronic device not to display the execution of the application related to the object in the second display area based on the electronic device not being flipped within the preset time.

10. A method for operating an electronic device, the method comprising:
    displaying a first screen in a first display area of a flexible display included in the electronic device and an object representing an application in a third display area corresponding to a hinge structure of the flexible display, in a folded state of the electronic device in which the flexible display is out-folded to allow the first display area and a second display area of the flexible display to be exposed to an outside, wherein, in the folded state, the first display area and the second display area face opposite directions;
    identifying a touch drag input to the object in the third display area, while the first display area faces a first direction and the second display area faces a second direction opposite to the first direction in the folded state, wherein touch sensing and a screen display of the second display area are deactivated in the folded state while the second display area faces the second direction opposite to the first direction;

based on identifying that a direction of the touch drag input is from the third display area to the first display area while the first display area faces the first direction in the folded state, displaying a portion of the first screen and an execution screen of the application related to the object in the first display area;

based on identifying that the direction of the touch drag input is from the third display area to the second display area while the first display area faces the first direction in the folded state, identifying whether the second display area faces the first direction in the folded state;

based on identifying a direction toward which the second display area faces is changed from the second direction to the first direction in the folded state within a predetermined time after identifying that the direction of the touch drag input is from the third display area to the second display area, activating the second display area and displaying an execution screen of the application related to the object in the second display area; and based on identifying the direction toward which the second display area faces is not changed from the second direction to the first direction in the folded state within the predetermined time after identifying that the direction of the touch drag input is from the third display area to the second display area, refraining from displaying the execution screen of the application related to the object in the second display area.

11. The method of claim 10, further comprising:
based on identifying a touch and hold input to the object, displaying content of the application in at least a portion of a first portion while the touch and hold input on the object is maintained.

12. The method of claim 10, further comprising:
based on identifying a tap input to the object, displaying content of the application and an object for performing a function related to the content in at least a portion of a first portion.

13. The method of claim 10, further comprising:
based on identifying a drag input for moving the object to the first display area, identifying a position and size of an area in which content of application is to be displayed, based on a direction of the drag input.

14. The method of claim 13, further comprising:
displaying the content in an area corresponding to the identified position and size of a first portion and displaying a portion of the first screen in a remaining area of the first portion.

15. The method of claim 10, further comprising:
displaying content of application in the second display area based on identifying that a state of the electronic device is changed from the folded state to an unfolded state while a touch input to the object is maintained.

16. The method of claim 10, further comprising excluding the object from the third display area, based on identifying a swipe input to the object.

17. The method of claim 10, wherein displaying the execution of the application related to the object in the second display area includes, after identifying that the direction of the touch drag input is from the third display area to the second display area, displaying the execution of the application related to the object in the second display area based on the electronic device being flipped within a preset time.

18. A non-transitory recording medium storing at least one instruction enabled to execute:

displaying a first screen in a first display area of a flexible display included in an electronic device and an object representing an application in a third display area corresponding to a hinge structure of the flexible display, in a folded state of the electronic device in which the flexible display is out-folded to allow the first display area and a second display area of the flexible display to be exposed to an outside, wherein, in the folded state, the first display area and the second display area face opposite directions;

identifying a touch drag input to the object in the third display area, while the first display area faces a first direction and the second display area faces a second direction opposite to the first direction in the folded state, wherein touch sensing and a screen display of the second display area are deactivated in the folded state while the second display area faces the second direction opposite to the first direction;

based on identifying that a direction of the touch drag input is from the third display area to the first display area while the first display area faces the first direction in the folded state, displaying a portion of the first screen and an execution screen of the application related to the object in the first display area;

based on identifying that the direction of the touch drag input is from the third display area to the second display area while the first display area faces the first direction in the folded state, identifying whether the second display area faces the first direction in the folded state;

based on identifying a direction toward which the second display area faces is changed from the second direction to the first direction in the folded state within a predetermined time after identifying that the direction of the touch drag input is from the third display area to the second display area, activating the second display area and displaying an execution screen of the application related to the object in the second display area; and based on identifying the direction toward which the second display area faces is not changed from the second direction to the first direction in the folded state within the predetermined time after identifying that the direction of the touch drag input is from the third display area to the second display area, refraining from displaying the execution screen of the application related to the object in the second display area.

* * * * *